(12) United States Patent
Buskirk et al.

(10) Patent No.: US 7,978,606 B2
(45) Date of Patent: Jul. 12, 2011

(54) SYSTEM AND METHOD FOR POLICING MULTIPLE DATA FLOWS AND MULTI-PROTOCOL DATA FLOWS

(75) Inventors: Glenn A. Buskirk, Maple Grove, MN (US); Rodolfo A. Santiago, St. Louis Park, MN (US)

(73) Assignee: SLT Logic, LLC, Boston, MA (US)

( * ) Notice: Subject to any disclaimer, the term of this patent is extended or adjusted under 35 U.S.C. 154(b) by 1132 days.

(21) Appl. No.: 11/231,297

(22) Filed: Sep. 20, 2005

(65) Prior Publication Data

US 2006/0159019 A1 Jul. 20, 2006

Related U.S. Application Data

(63) Continuation of application No. 11/058,904, filed on Feb. 16, 2005, now Pat. No. 7,453,892, which is a continuation of application No. 09/849,914, filed on May 4, 2001, now Pat. No. 6,901,052.

(51) Int. Cl.
*G01R 31/08* (2006.01)

(52) U.S. Cl. ........ 370/235; 370/428; 370/468; 370/232; 370/401

(58) Field of Classification Search ........... None
See application file for complete search history.

(56) References Cited

U.S. PATENT DOCUMENTS

| | | | |
|---|---|---|---|
| 5,172,374 A | 12/1992 | De Cristofaris et al. |
| 5,231,633 A | 7/1993 | Hluckyi et al. |
| 5,231,663 A | 7/1993 | Earl et al. |
| 5,260,935 A | 11/1993 | Turner |
| 5,268,900 A | 12/1993 | Hluchyj et al. |
| 5,452,287 A | 9/1995 | DeCecco et al. |
| 5,455,825 A | 10/1995 | Lauer et al. |
| 5,497,371 A | 3/1996 | Ellis et al. |
| 5,541,920 A | 7/1996 | Angle et al. |
| 5,566,170 A | 10/1996 | Bakke et al. |
| 5,570,360 A | 10/1996 | Klausmeier et al. |
| 5,579,312 A | 11/1996 | Regache |
| 5,598,410 A | 1/1997 | Stone |
| 5,600,598 A | 2/1997 | Skjaveland et al. |
| 5,629,936 A | 5/1997 | Lee et al. |
| 5,666,353 A | 9/1997 | Klausmeier et al. |
| 5,689,500 A | 11/1997 | Chiussi et al. |
| 5,748,905 A | 5/1998 | Hauser et al. |
| 5,764,641 A | 6/1998 | Lin |
| 5,781,531 A | 7/1998 | Charny |

(Continued)

OTHER PUBLICATIONS

U.S. Appl. No. 09/849,810, filed May 4, 2001, Santiago et al.

(Continued)

*Primary Examiner* — Duc C Ho
(74) *Attorney, Agent, or Firm* — Patterson, Thuente, Christensen & Pedersen, P.A.

(57) ABSTRACT

A system and method for policing one or more flows of a data stream of packets associated with differing transmission protocols. The current capacity level for each flow is determined, as is the packet protocol associated with each packet. A packet parameter in the packet that is indicative of the bandwidth consumption of the packet is identified. The packet parameter is converted to a predetermined format if the packet is not associated with a predetermined packet protocol. A common bandwidth capacity test is performed to determine whether the packet is conforming or non-conforming, and is a function of the packet parameter and the current bandwidth capacity level.

6 Claims, 13 Drawing Sheets

U.S. PATENT DOCUMENTS

| | | | |
|---|---|---|---|
| 5,812,476 A | | 9/1998 | Segawa |
| 5,828,654 A | | 10/1998 | Takase et al. |
| 5,850,399 A | * | 12/1998 | Ganmukhi et al. ........... 370/412 |
| 5,864,540 A | | 1/1999 | Bonomi et al. |
| 5,870,396 A | | 2/1999 | Abu-Amara et al. |
| 5,870,629 A | | 2/1999 | Borden et al. |
| 5,878,229 A | | 3/1999 | Bass et al. |
| 5,896,383 A | | 4/1999 | Wakeland |
| 5,901,095 A | | 5/1999 | Crafts |
| 5,907,511 A | | 5/1999 | Crafts |
| 5,918,002 A | | 6/1999 | Klemets et al. |
| 5,923,596 A | | 7/1999 | Wu et al. |
| 5,923,656 A | | 7/1999 | Duan et al. |
| 5,926,101 A | | 7/1999 | Dasgupta |
| 5,943,481 A | | 8/1999 | Wakeland |
| 5,973,952 A | | 10/1999 | Crafts |
| 5,995,439 A | | 11/1999 | Watanabe et al. |
| 6,018,527 A | | 1/2000 | Yin et al. |
| 6,021,116 A | | 2/2000 | Chiussi et al. |
| 6,021,132 A | | 2/2000 | Muller et al. |
| 6,031,835 A | | 2/2000 | Abali et al. |
| 6,032,190 A | | 2/2000 | Bremer et al. |
| 6,034,956 A | | 3/2000 | Olnowich et al. |
| 6,046,979 A | | 4/2000 | Bauman |
| 6,046,980 A | | 4/2000 | Packer |
| 6,047,002 A | | 4/2000 | Hartmann et al. |
| 6,052,375 A | | 4/2000 | Bass et al. |
| 6,067,298 A | | 5/2000 | Shinohara |
| 6,072,800 A | | 6/2000 | Lee |
| 6,072,989 A | | 6/2000 | Witters et al. |
| 6,081,524 A | | 6/2000 | Chase et al. |
| 6,104,700 A | | 8/2000 | Haddock et al. |
| 6,108,305 A | | 8/2000 | Charny et al. |
| 6,118,761 A | | 9/2000 | Kalkunte et al. |
| 6,130,878 A | * | 10/2000 | Charny ................... 370/395.41 |
| 6,136,638 A | | 10/2000 | Lee et al. |
| 6,141,355 A | | 10/2000 | Palmer et al. |
| 6,141,686 A | | 10/2000 | Jackowski et al. |
| 6,147,970 A | | 11/2000 | Troxel |
| 6,166,403 A | | 12/2000 | Castagnetti et al. |
| 6,167,445 A | | 12/2000 | Gai et al. |
| 6,175,568 B1 | | 1/2001 | Awdeh |
| 6,185,635 B1 | | 2/2001 | O'Loughlin et al. |
| 6,192,406 B1 | | 2/2001 | Ma et al. |
| 6,259,699 B1 | | 7/2001 | Opalka et al. |
| 6,320,864 B1 | | 11/2001 | Hebb et al. |
| 6,333,917 B1 | | 12/2001 | Lyon et al. |
| 6,335,935 B2 | | 1/2002 | Kadambi et al. |
| 6,430,154 B1 | | 8/2002 | Hunt et al. |
| 6,449,656 B1 | | 9/2002 | Elzur et al. |
| 6,453,360 B1 | | 9/2002 | Muller et al. |
| 6,477,670 B1 | | 11/2002 | Ahmadvand |
| 6,538,989 B1 | | 3/2003 | Carter et al. |
| 6,594,268 B1 | | 7/2003 | Aukia et al. |
| 6,606,317 B1 | | 8/2003 | Beadle et al. |
| 6,608,816 B1 | | 8/2003 | Nichols |
| 6,618,356 B1 | | 9/2003 | Bonaventure |
| 6,651,101 B1 | | 11/2003 | Gai et al. |
| 6,687,247 B1 | | 2/2004 | Wilford et al. |
| 6,721,271 B1 | | 4/2004 | Beshai et al. |
| 6,728,253 B1 | | 4/2004 | Jeffries et al. |
| 6,757,249 B1 | | 6/2004 | Kerjriwal et al. |
| 6,760,774 B1 | | 7/2004 | Soumiya et al. |
| 6,768,717 B1 | | 7/2004 | Reynolds et al. |
| 6,772,325 B1 | | 8/2004 | Irie et al. |
| 6,792,470 B2 | | 9/2004 | Hakenberg et al. |
| 6,795,470 B1 | | 9/2004 | Spilios |
| 6,798,746 B1 | * | 9/2004 | Kloth et al. .................... 370/235 |
| 6,826,147 B1 | | 11/2004 | Nandy et al. |
| 6,885,639 B2 | | 4/2005 | Kamiya |
| 6,901,052 B2 | | 5/2005 | Buskirk et al. |
| 6,904,057 B2 | | 6/2005 | Sarkinen |
| 6,934,250 B1 | | 8/2005 | Kejriwal et al. |
| 6,934,294 B2 | | 8/2005 | Bertagna |
| 6,944,168 B2 | | 9/2005 | Paatela et al. |
| 6,947,996 B2 | | 9/2005 | Assa et al. |
| 6,968,554 B1 | | 11/2005 | Macdonald et al. |
| 6,996,062 B1 | * | 2/2006 | Freed et al. ................... 370/235 |
| 7,042,848 B2 | | 5/2006 | Santiago et al. |
| 7,099,275 B2 | | 8/2006 | Sarkinen |
| 7,116,680 B1 | | 10/2006 | Kramer et al. |
| 7,149,187 B1 | | 12/2006 | Jacobson et al. |
| 7,151,744 B2 | | 12/2006 | Sarkinen |
| 7,185,073 B1 | * | 2/2007 | Gai et al. ...................... 709/221 |
| 7,215,637 B1 | * | 5/2007 | Ferguson et al. .......... 370/230.1 |
| 7,272,675 B1 | | 9/2007 | Paul et al. |
| 7,298,738 B1 | | 11/2007 | Parruck et al. |
| 7,539,195 B2 | | 5/2009 | Paatela et al. |
| 7,688,853 B2 | | 3/2010 | Santiago et al. |
| 2001/0007560 A1 | | 7/2001 | Masuda et al. |
| 2001/0033552 A1 | | 10/2001 | Barrack et al. |
| 2001/0048661 A1 | | 12/2001 | Clear et al. |
| 2002/0075803 A1 | | 6/2002 | Zaharychuk et al. |
| 2002/0080780 A1 | | 6/2002 | McCormick et al. |
| 2002/0097677 A1 | | 7/2002 | Hoar et al. |
| 2002/0097726 A1 | * | 7/2002 | Garcia-Luna-Aceves et al. ........................ 370/395.31 |
| 2002/0116527 A1 | | 8/2002 | Chen et al. |
| 2002/0136230 A1 | | 9/2002 | Dell et al. |
| 2002/0141427 A1 | | 10/2002 | McAlpine |
| 2002/0196796 A1 | | 12/2002 | Ambe et al. |
| 2003/0021230 A1 | | 1/2003 | Kuo et al. |
| 2003/0046429 A1 | | 3/2003 | Sonksen |
| 2003/0112756 A1 | | 6/2003 | Le Gouriellec et al. |
| 2003/0118029 A1 | | 6/2003 | Maher, III et al. |
| 2004/0125815 A1 | | 7/2004 | Shimazu et al. |
| 2004/0199630 A1 | | 10/2004 | Sarkissian et al. |
| 2004/0202184 A1 | * | 10/2004 | Yazaki et al. ............. 370/395.31 |
| 2005/0193114 A1 | * | 9/2005 | Colby et al. ................... 709/226 |
| 2006/0039372 A1 | | 2/2006 | Sarkinen |
| 2009/0097407 A1 | | 4/2009 | Buskirk et al. |
| 2009/0213856 A1 | | 8/2009 | Paatela et al. |

OTHER PUBLICATIONS

"Asynchronous Transfer Mode (ATM)", http://iwander.vlsi.uiuc.edu/abr/atmintro.html; printed Apr. 26, 2001; pp. 1-5.

U.S. Appl. No. 11/058,904, filed Feb. 15, 2005.

U.S. Appl. No. 09/849,810, filed May 4, 2001.

David Husak et al., "Network Processor Programming Models: The Key to Achieving Faster Time-To-Market and Extending Product Life", C-PORT, A Motorola Company, May 4, 2000; 8 pages.

"Introduction to ABR," http://iwander.vlsi.uiuc.edu/abr/abrintro.html, printed Apr. 26, 2001, pp. 1-4.

"The Virtual Output Queue," http://iwander.vlsi.uiuc.edu/abr/virtqueue.html, printed Apr. 26, 2001, pp. 1-7.

"Simulation Results," http://iwander/vlsi.uiuc.edu/abr/simulation_results.html, printed Apr. 26, 2001, pp. 1-4.

"Reinventing the Switch Fabric Architecture," Communication System Design, http://www.csdmag.com/story/OEG20010521S0113, Jun. 1, 2001.

Application and File History of U.S. Appl. No. 09/849,913, filed May 4, 2001, now U.S. Patent No. 6,904,057, issued Jun. 7, 2005, Inventors Sarkinen et al.

Application and File History of U.S. Appl. No. 11/146,415, filed Jun. 6, 2005, Inventors Sarkinen et al.

Application and File History of U.S. Appl. No. 11/257,386, filed Oct. 24, 2005, now U.S. Patent No. 7,688,853, issued Mar. 30, 2010, Inventors Santiago et al.

Application and File History of U.S. Appl. No. 09/849,804, filed May 4, 2001, now U.S. Patent No. 6,944,168, issued Sep. 13, 2005, Inventors Paatela et al.

Application and File History of U.S. Appl. No. 11/224,692, filed Sep. 12, 2005, now U.S. Patent No. 7,539,195, issued May 26, 2009, Inventors Paatela et al.

Application and File History of U.S. Appl. No. 12/437,573, filed May 8, 2009, Inventors Paatela et al.

Application and File History of U.S. Appl. No. 11/950,651, filed Dec. 5, 2007, Inventors Sarkinen et al.

Application and File History of U.S. Appl. No. 09/849,914, filed May 4, 2001, now U.S. Patent No. 6,901,052, issued May 31, 2005, Inventors Buskirk et al.

Application and File History of U.S. Appl. No. 12/252,108, filed Oct. 15, 2008, Inventors Buskrik et al.

Application and File History of U.S. Appl. No. 09/957,750, filed Sep. 21, 2001, now U.S. Patent No. 7,099,275, issued Aug. 29, 2006, Inventors Sarkinen et al.

Application and File History of U.S. Appl. No. 09/957,751, filed Sep. 21, 2001, now U.S. Patent No. 7,151,744, issued Dec. 19, 2006, Inventors Sarkinen et al.

"*EZCHIP Technologies Completes Filing Patent Applications for its 10/40G Network Processor Core Technology*," http://www.exchip.com/html/press_000918.htm1, printed Jan. 22, 2001, pp. 1-3.

"*7-Layer Packer Processing: A Performance Analysis, White Paper*," EZchip, http://www.ezchip.com/html/tech_7layers.html, Retrieved Jan. 22, 2001, pp. 1-8.

"*Network Process Designs for Next-Generation Networking Equipment, White Paper*," Ezchip, http://www.ezchip.com/html/tech_nsp-paper.html, Retrieved Jan. 22, 2001, pp. 1-8.

"*Gilder Technology Report*," Ezchip, Sep. 2000, http://www.ezchip.com/html/gilder.html, Retrieved Jan. 22, 2001, pp. 1-2.

"*Frame Based ATM Over SONET/SDH Transport (FAST)*," the ATM Forum, Technical Committee, fb-fbatm-0151.000, Jul. 2000, 37 pgs.

"*A Single Rate Three Color Marker*," Heinanen et al., University of Pennsylvania, Sep. 1999, pp. 1-6.

"*A Two Rate Three Color Marker*," Heinanen et al., University of Pennsylvania, Sep. 1999, pp. 1-5.

"Putting Round Tables in Silicone," IEEE Network, vol. 6, No. 1, Jan. 1992, 11 pgs.

David Husak, "Network Processors: A Definition and Comparison," C-PORT, A Motorola Company, Date Unknown, 8 pgs.

"Products," Applications, C-PORT, A Motorola Company, http://www.cportcorp.com/products/applications.htm, Retrieved Jan. 23, 2001, 3 pgs.

Husak et al., "Network Processor Programming Models: The Key to Achieving Faster Time-to-Market and Extending Product Life," C-PORT, A Motorola Company, May 4, 2000, 8 pgs.

"C-5™ Digital Communications Processor," Product Brief, C-PORT, A Motorola Company, Date Unknown, 8 pgs.

William Wong, "Network Processors Take the High Road . . . and the Low Road," Electronic Design, Jul. 10, 2000, http://www.planetee.com/plantee/servlet/display-document?ArticleID==6798, Retrieved Jun. 15, 2001, 3 pgs.

"Network Processors Take the High Road . . . and the Low Road," Electronic Design, Jul. 10, 2000, http://www.plan-etee.com/plantee/servlet/displaydocument?ArticleID==6799, Retrieved Jun. 15, 2001, 2 pages.

"Network Processors Take the High Road . . . and the Low Road," Electronic Design—Jul. 10, 2000, http://www.plan-etee.com/planetee/servlet/DisplayDocument?ArticleID==6800, Retrieved Mar. 7, 2002, 3 pages.

"Network Processors Take the High Road . . . and the Low Road," Electronic Design Jul. 10, 2000, http://www.plan-etee.com/planetee/servlet/DisplayDocument?ArticleID==6802 Retrieved Jun. 15, 2001, 1 page.

"Network Processors Take the High Road . . . and the Low Road," Electronic Design Jul. 10, 2000, http://www.plan-etee.com/planetee/servlet/DisplayDocument?ArticleID==6804, Retrieved Jun. 15, 2001, 1 page.

"Network Processors Take the High Road . . . and the Low Road," Electronic Design Jul. 10, 2000, http://www.plan-etee.com/planetee/servlet/DisplayDocument?ArticleID==6806. Retrieved Jun. 15, 2001, 1 page.

"Network Processors Take the High Road . . . and the Low Road," Electronic Design Jul. 10, 2000, http://www.plan-etee.com/planetee/servlet/Display Document?ArticleID==6808, Retrieved Jun. 15, 2001, 1 page.

Bossardt et al., "ABR Architecture and Simulation for an Input-Buffered and Per-VC-Queued ATM Switch," Department of Electrical and Computer Engineering, University of Illinois, 6 pgs, 1998.

\* cited by examiner

SYSTEM AND METHOD FOR POLICING MULTIPLE DATA FLOWS AND MULTI-PROTOCOL DATA FLOWS

CROSS-REFERENCE RELATED APPLICATIONS

This application is a continuation of U.S. patent application Ser. No. 11/058,904, filed Feb. 16, 2005, entitled "SYSTEM AND METHOD FOR POLICING MULTIPLE DATA FLOWS AND MULTI-PROTOCOL DATA FLOWS", now U.S. Pat. No. 7,453,892, which is a continuation of U.S. patent application Ser. No. 09/849,914, filed May 4, 2001, entitled, "SYSTEM AND METHOD FOR POLICING MULTIPLE DATA FLOWS AND MULTI-PROTOCOL DATA FLOWS", now U.S. Pat. No. 6,901,052. The following co-pending patent applications of common assignee contains some common disclosure: U.S. application Ser. No. 09/849,804, filed May 4, 2001, entitled, "SYSTEM AND METHOD FOR PROVIDING TRANSFORMATION OF MULTI-PROTOCOL PACKETS IN A DATA STREAM," now U.S. Pat. No. 6,944,168, which is incorporated herein by reference in its entirety; U.S. application Ser. No. 09/849,913, filed May 4, 2001, entitled, "A METHOD AND APPARATUS FOR PROVIDING MULTI-PROTOCOL, MULTI-STAGE, REAL-TIME FRAME CLASSIFICATION," now U.S. Pat. No. 6,904,037, which is incorporated herein by reference in its entirety; US. application Ser. No. 09/849,810, filed May 4, 2001, entitled, "SYSTEM AND METHOD FOR HIERARCHICAL POLICING OF FLOWS AND SUBFLOWS OF A DATA STREAM," now U.S. Pat. No. 7,042,848, which is incorporated herein by reference in its entirety.

FIELD OF THE INVENTION

This invention relates in general to communication networks, and more particularly to a method and apparatus for collectively policing packets of multiple transmission protocols.

BACKGROUND OF THE INVENTION

Enhancing today's networking technology is a perpetual goal in the communications industry. As the raw speeds of large-scale and personal computing devices soar, the tremendous increase in data transmission demands continue to push the networking bandwidth envelope to capacity. As bandwidth-intensive multimedia content continues to gain popularity and course the veins of the Internet, the unrelenting bandwidth dilemma is no less urgent today than yesterday. This has fueled the need for high-bandwidth broadband systems.

The term "broadband" has often been used to describe high-bandwidth transmission of data signals, such as data, video, voice, video conferencing, etc. Broadband philosophies often address networking principles applicable to the backbone of the networking system, since the networking backbone generally faces the highest bandwidth demands. There are many competing technologies for delivering broadband access. For example, there are a number of standards used in digital telecommunications, including TCP/IP, Ethernet, HDLC, ISDN, ATM, X.25, Frame Relay, Digital Data Service, FDDI (Fiber Distributed Data Interface), Ti, xDSL, Wireless, Cable Modems, and Satellite among others. Many of these standards employ different packet and/or frame formats. The term "frame" is often used in reference to encapsulated data at OSI layer 2, including a destination address, control bits for flow control, the data or payload, and CRC (cyclic redundancy check) data for error checking. The term "packet" is often used in reference to encapsulated data at OSI layer 3. Further, the term "cell" is often used in reference to a group of bytes/octets conditioned for transmission across a network. However, it should be understood that for purposes of the present application, the terms packet, frame, and cell may be used interchangeably to refer to groups or collections of data. Further, a packet format or frame format generally refers to how data is encapsulated with various fields and headers for transmission across the network. For example, a data packet typically includes a destination address field, a length field, an error correcting code (ECC) field or cyclic redundancy check (CRC) field, as well as headers and trailers to identify the beginning and end of the packet. The terms "packet format" and "frame format," also referred to as "cell format," are generally synonymous for purposes of this application.

Packets transmitted across a network are associated with a transmission protocol. A protocol is a set of rules that governs how devices on a network exchange information. Packets traversing the network may be of differing formats or "protocols." This is often due to the development of incompatible proprietary protocols by computer manufacturers. While protocol compatibility and standardization are becoming increasingly important, even standard protocols provide multiple options and are not always interchangeable between applications. Further, new protocols will continue to be developed to address certain network limitations, or to otherwise improve network data transmission. All of these factors contribute to the reality that multiple transmission protocols exist, and will likely continue to exist.

One standard protocol is the Internet Protocol (IP), which is a "best-effort," connectionless protocol responsible for delivering data from host to host across a network such as the Internet. IP is a predominant protocol used to transmit data across the Internet. Other protocols are used to transmit packets across the Internet as well, such as Framed ATM over SONET/SDH Transport (FAST) and. IP on multiprotocol label switching (MPLS). FAST is a new protocol intended to improve the performance of asynchronous transfer mode (ATM). FAST introduces a variable length user data field, while preserving the proven advantages of ATM, such as real quality of service guarantees, the security and traffic isolation provided by virtual connections, network management, traffic management, control mechanisms for bandwidth on demand, etc. MPLS integrates layer-2 information about network links into layer-3 (IP) within a particular autonomous system in order to simplify and improve IP-packet exchange. MPLS essentially provides connection-oriented labeling in an otherwise connectionless environment, which has resulted in MPLS being considered associated with layer-2.5. With MPLS, different flows can be classified, and different service levels can be associated with the different flow classifications.

As described above, packets transmitted on a network such as the Internet may be associated with one of a number of different protocols, and thus packets associated with different protocols may be received at a given node, switch, router, etc. As described more fully below, the introduction of multiple packet protocols at a node requires special consideration when the entire data flow is monitored for conformance with a particular quality of service.

In order to make the most efficient use of the communication paths and routing equipment possible, policing methods have been devised. Users of various levels could obtain different qualities of service (QoS), which would then require "policing" to ensure conformance with the contracted QoS. Policing generally refers to the packet-by-packet monitoring function at a network border, such as an ingress point at a network node. This monitoring function ensures that the promised QoS is not violated. The amount of traffic flowing into or out of a particular interface may therefore require limiting actions to achieve a specific policy goal.

At a particular network node or other ingress point, individual packets that make up a communications traffic stream can be classified into several flows or connections. Different QoS can be committed per flow by metering packets arriving at a given interface on a flow-by-flow basis. Flows whose effective bit rate exceeds what is committed in the service contract will be classified as non-conforming, and packets arriving at a time when its corresponding flow is non-conforming will be marked as non-conforming. Whether packets are marked as non-conforming effects the likelihood of the packets being discarded. This metering of packets, i.e., policing, for the purpose of providing differentiated service per flow helps to regulate the bandwidth.

Currently, varying data protocols require different methods for policing traffic flows. For example, the ATM Forum's FAST data link protocol and the Internet Engineering Task Force (IETF)'s IP data link protocol require different methods for policing traffic flows. FAST, being based on ATM cells, recommends the use of a variant of the GCRA, referred to as the Frame Based GCRA (F-GCRA). F-GCRA is the policing method provided in the ATM Forum's specification of FAST, and IP packet policing generally involves the use of either Single Rate Three Color Marker (srTCM) or Two Rate Three Color Marker (trTCM) techniques.

As can be seen, different methods are required for policing different traffic flows, such as F-GCRA for FAST packet flows and srTCM/trTCM for IP traffic flows. Due to very high data transmission speeds in today's networks, policing methods have conventionally required specific methodologies, generally designed as specialized hardware engines in application-specific integrated circuits (ASICs). Because information may be transmitted across networks (e.g., the Internet) using a variety of different networking protocols, multiple specialized circuits are required to accommodate packets of each packet protocol that might traverse the network switch, router, bridge, or other intermediate system between the source and destination. For example, a separate policing methodology, and therefore separate ASIC, may be required for each packet protocol. This results in higher costs, part counts, and general complexities, while adversely impacting system efficiencies.

Accordingly, there is a need in the communications industry for a method and apparatus for commonly policing packets of multiple transmission protocols. The present invention fulfills these and other needs, and offers other advantages over the prior art policing approaches.

SUMMARY OF THE INVENTION

To overcome limitations in the prior art described above, and to overcome other limitations that will become apparent upon reading and understanding the present specification, the present invention discloses a system, apparatus and method for policing one or more flows of a data stream of packets associated with differing transmission protocols. The present invention may be used with multiple packet flows and multiple packet protocols, even where the multiple packet flows are multiplexed into a single data stream. The invention further provides policing on multiple flows by determining which protocol each packet is associated with, and carrying out an appropriate operation depending on the type of protocol to which the packet belongs. This allows the policing module to be used generically in a system, such as a router, switch, bridge, etc., even where multiple network protocols are used.

In accordance with one embodiment of the invention, a method is provided for policing one or more flows of a data stream of packets associated with differing transmission protocols. The method includes determining at least one current bandwidth capacity level for the flow, and determining the packet protocol associated with each packet. A packet parameter in the packet that is indicative of the bandwidth consumption of the packet is identified. The packet parameter is converted to a predetermined format if the packet is not associated with a predetermined packet protocol. A common bandwidth capacity test is performed, where the test performed is used to determine whether the packet is conforming or non-conforming, and is a function of the packet parameter and the current bandwidth capacity level.

In accordance with another embodiment of the invention, a packet policing system provides multi-protocol policing of packets of a data stream. The policing system includes a classifier to receive and parse the data stream into a plurality of multi-protocol traffic flows. A policing processor is coupled to the classifier to receive each of the traffic flows. The processor is configured to convert each of the packets into a predetermined format, and to perform a shared bandwidth capacity test in order to determine packet conformance for each of the packets. The shared test is applied to all packets, regardless with their original protocol affiliation.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE PREFERRED EMBODIMENTS

In the following description of an exemplary embodiment, reference is made to the accompanying drawings which form a part hereof, and in which is shown by way of illustration specific embodiments in which the invention may be practiced. It is to be understood that other embodiments may be utilized, as structural and operational changes may be made without departing from the scope of the present invention.

Generally, the present invention is directed to an N-flow policing engine and methodology capable of policing packets of multiple protocols. The policing method and apparatus may be used with multiple packet flows and multiple packet protocols, even where the multiple packet flows are multiplexed into a single data stream. For example, the invention may be used for both Internet Protocol (IP) packets and Frame Based ATM over Sonet/SDH Transport (FAST) packets of one or more flows multiplexed into a single packet stream. The invention provides policing on multiple flows and protocols by determining which flow and protocol each packet is associated with, and carrying out an appropriate operation depending on the type of flow to which the packet belongs. This allows the policing module to be used generically in a system, such as a router, switch, bridge, etc., even where multiple network protocols are used.

A significant portion of the ensuing description is presented in terms of an exemplary policing engine embodiment according to the invention, in which policing for two representative protocols, namely IP and FAST packets, is provided. It should be recognized, and will become readily apparent to those skilled in the art from a reading of the following description, that different protocols and numbers of protocols than those presented in the illustrated embodiments are contemplated by the invention. Therefore, the following references to the exemplary embodiments of policing IP and FAST packets are illustrative examples, as the invention is clearly not limited thereto.

In order to gain a better understanding of the invention, a description of a networking environment in which the present invention is applicable is provided.

Data transmitted over networks such as the Internet 10 may be in the form of e-mail messages, file transfers and downloads, web page loading, real-time voice, real-time video, and the like. The data is generally broken up into a number of data packets, each of which is assigned a header to direct the data packet to the desired destination, among other things. Each packet is separately dispatched to the destination, although more than one different route may be taken by the different packets associated with the data.

Figure 1:
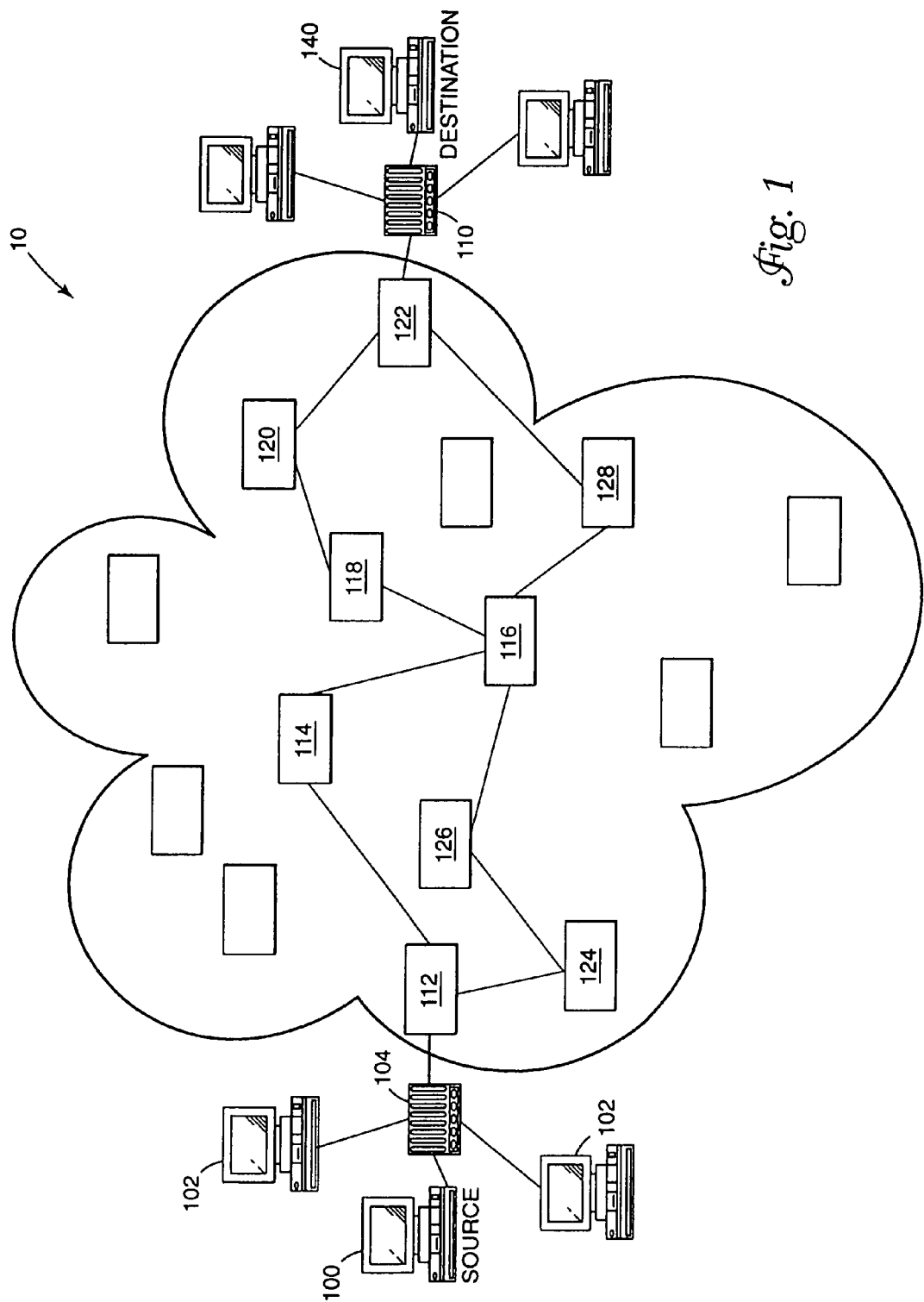
FIG. 1 is a block diagram illustrating a networking environment in which the principles of the present invention may be applied.

For example, the source computer 100 of FIG. 1 may be configured in a local area network (LAN) and coupled to other computers 102 via a hub 104. A first one or more data packets may reach the hub 110 of the destination LAN via a first path, through routers 112, 114, 116, 118, 120 and 122. A second one or more data packets may reach the hub 1 10 via a second path, such as through routers 112, 124, 126, 116, 128 and 122. These different packets may take alternative routes due to equipment congestion or failure of a node, or to load share where possible. The routers associated with the core of the Internet can reconfigure the paths that these packets follow. This is due to the router's ability to analyze the header information corresponding to the data packet, and to communicate line condition and other information between routers. The routers handling data at the major traffic points on large networks, such as the Internet, are generally large stand-alone systems. After transmitting the data from node to node through the network, the packets are reassembled at the receiving end, and availed to the desired destination system 140.

In connection with the transmission of packets through the network is the concept of quality of service (QoS) and policing. The QoS refers to the ability of the network to accommodate different service levels to selected network traffic. The goal of implementing quality of service parameters is to prioritize certain flows over other flows based on some criteria. For example, priority may include dedicated bandwidth, controlled jitter and latency, improved loss characteristics, and the like. This can be performed, for example, by raising the priority of a flow or limiting the priority of another flow. Thus, each flow traversing the switches/routers shown in FIG. 1 may be subject to a quality of service parameter that affects the speed and reliability in which the packets are transmitted.

Networking that implements such quality of service parameters is often referred to as policy-based networking. Policy-based networking is the management of the network so that various kinds of traffic (e.g., data, voice, video, etc.) obtain the availability and bandwidth needed to serve the network's users effectively. Using policy statements, network administrators can specify which kinds of service to give priority, at what times, and at what parts of their IP-based network. A policy-based network may include a network management console where policies are entered, modified, or retrieved from a policy repository. A policy decision point (PDP) is typically a server that retrieves policies from the policy repository, and acts on the policies on behalf of routers, switches, and other network devices that enforce the policies throughout the network.

As will be described more fully below, the present invention may be used in connection with such routers, switches, and other network devices that enforce such policies. Such a module is referred to herein as a policing engine or policer, and refers to the structural and/or operational module used to carry out the policing functions according to the present invention. Further, the present invention may be used in connection with multi-protocol flow classifying/parsing systems, as well as appropriate editing (also referred to as "packet transformation") systems to carry out marking where required. In one embodiment of the invention, the policing engine in accordance with the present invention is housed in a package or chip common to the classifier and editing functionalities. The device enables advanced services to be applied at speeds of 10 Gbps or more. Tightly coupled parsing, policing, and packet transformation allows the collective device to perform dynamic packet transformation for quality of service (QoS) based on the current flow state and also effectively handles dynamic header processing such as required by multiprotocol label switching (MPLS) routers.

Figure 2:
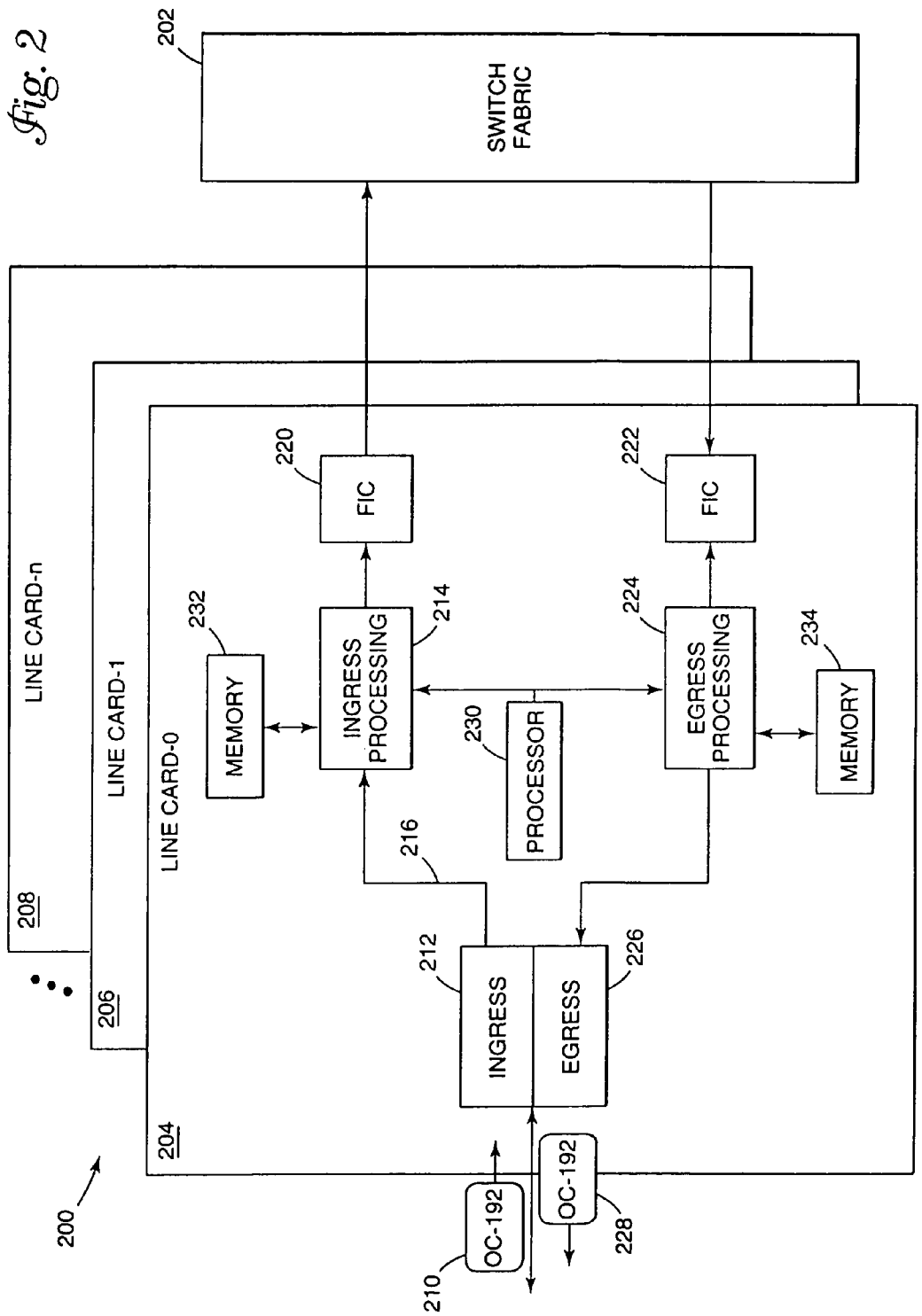
FIG. 2 is a block diagram of an embodiment of a router system in which the present invention may be applied.

Referring now to FIG. 2, one embodiment of a router system 200 is illustrated in which the present invention may be applied. One or more line cards are provided, each of which are coupled to a switch fabric 202. In the present example, a plurality of line cards are provided, including line card-0 204, line card-1 206 through a finite number of line cards represented by line card-n 208. In one embodiment of the invention, each of the line cards utilize analogous circuitry. Line card-0 204 will therefore be described, with the understanding that one or more of the remaining line cards in the router system may implement analogous circuitry.

The line card-0 204 of the illustrated embodiment receives as input packet-over-SONET/SDH (POS) frames via the network. As is known in the art, SONET/SDH is a high-speed time division multiplexing (TDM) physical-layer transport technology. POS provides a means for using the speed and management capabilities of SONET/SDH to optimize data transport, although originally optimized for voice. A SONET/SDH frame is 810 bytes and is normally represented as a two-dimensional byte-per-cell grid of 9 rows and 90 columns. The SONET/SDH frame is divided into transport overhead and payload bytes. The transport overhead bytes include section and line overhead bytes, while the payload bytes are made up of the payload capacity and some more overhead bytes referred to as path overhead. The overhead bytes are responsible for the management capabilities of SONET/SDH. The basic transmission rate of SONET (51.840 Mbps), referred to as Synchronous Transport Signal level 1 (STS-1), is achieved by sampling the 810-byte frames at 8000 frames per second. SONET features an octet-synchronous multiplexing scheme with transmission rates in multiples of 51.840 Mbps, whereby STS-192 thereby provides transmission at approximately 10 Gbps. Packet Over SONET/SDH (POS) allows core routers to send native IP packets directly over SONET/SDH frames. POS provides a relatively low packet overhead and cost per Mbit than other data transport methods, which allows POS to efficiently support increases in IP traffic over existing and new fiber networks.

As shown in the exemplary embodiment of FIG. 2, incoming POS OC-192 frames 210 originate from an OC-192 framer (not shown) and arrive at the line card-0 204 at the ingress interface 212. The frames are transferred to the ingress processing circuit 214 via an interface 216, such as the Optical Internetworking Forum (OIF) System Packet Interface-4 (SPI-4). OIF SPI-4 describes a data path interface between the physical and link layers to support physical line data rates up to 10 Gb/s, and may be used in connection with the present invention, as may other interfaces of appropriate speed.

Ingress processing circuit 214, which in one embodiment of the invention is housed in a single chip, performs the necessary lookups, policing and editing of the packet. If necessary, the frame can be redirected to the host. The frames are fed out of the ingress processing circuit 214 via an OIF SPI-4 interface 218 to a Fabric Interface Chip (FIC) circuit 220. The FIC 220 converts the stream from one format to another, such as from POS frames to Common Switch Interface (CSIX) cells, and distributes the cells over the switch fabric 202.

Similarly, cells switched at the switch fabric 202 may be received at the FIC 222 and provided to the egress processing circuit 224. Frames are transferred to the egress interface 226, and output as POS OC-192 frames 228. A processor 230 may be coupled to the ingress processing circuit 214 and the egress processing circuit 224 to perform a variety of functions, including providing coprocessor support. Memories 232, 234 represent one or more memories associated with the ingress processing module 214 and the egress processing module 224, respectively.

Figure 3:
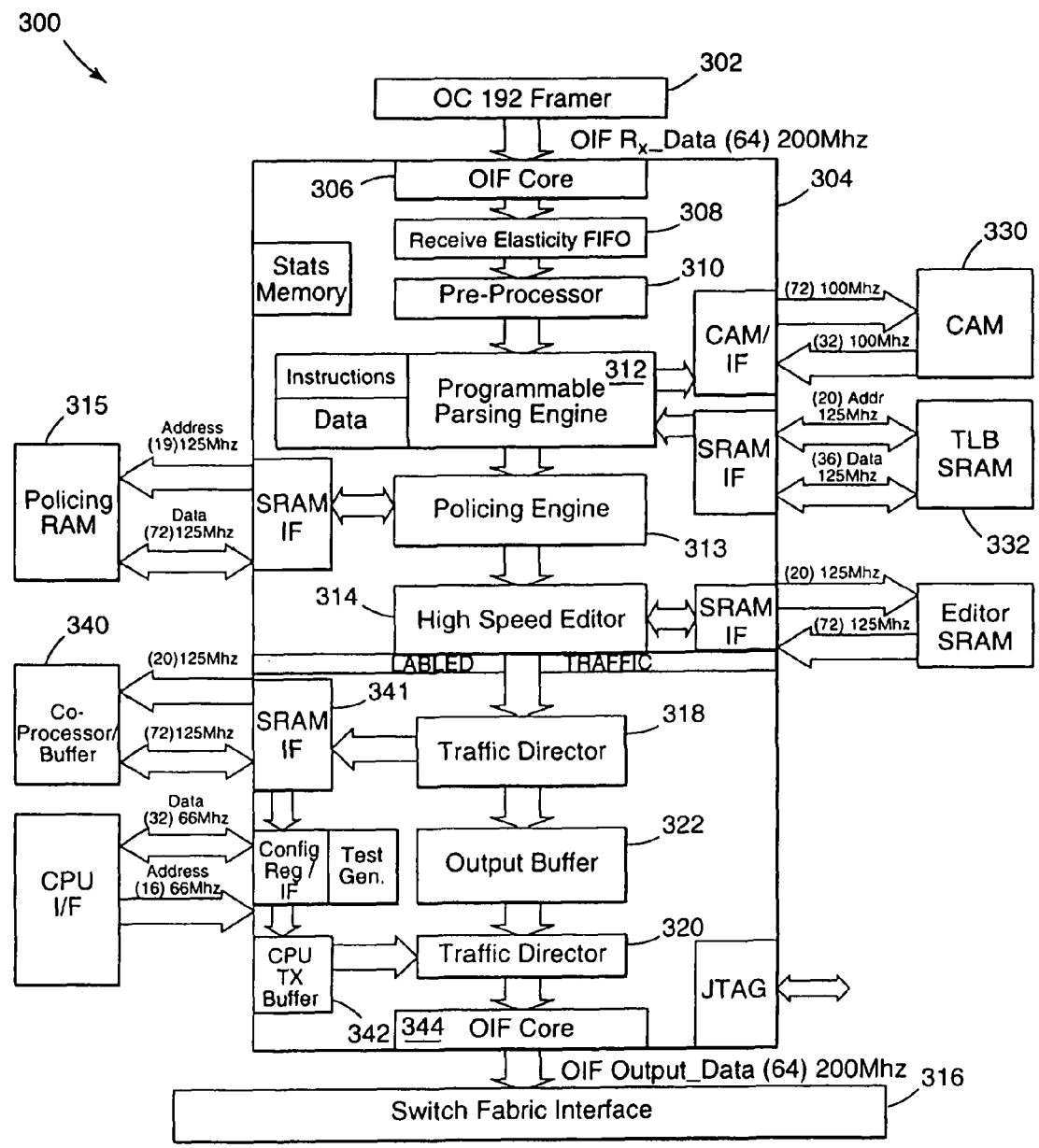
FIG. 3 is a block diagram of an exemplary embodiment of an ingress processing system in accordance with the present invention.

Referring now to FIG. 3, an exemplary embodiment of an ingress processing system 300 in accordance with the present invention is provided. The system 300 is described as an example of a system in which the principles of the present invention may be applied. The ingress processing system 300 interfaces to industry standard physical layer devices such as an OC-192 framer 302. In one embodiment of the invention, a portion of the ingress processing system 300 is housed on a single chip, illustrated in FIG. 3 as chip 304. While the invention is equally applicable where the physical chip boundaries differ from that illustrated in FIG. 3, the present invention is particularly efficient and useful in such a tightly coupled arrangement.

The interface 306, such as an OIF interface, provides the interface between the ingress processing circuit 304 and the framer 302. In one embodiment, the interface 306 is a 200 MHz OIF SPI-4 interface including a 64-bit data input. An elasticity buffer 308, which in one embodiment is a first-in-first-out (FIFO), allows table maintenance updates to be performed without dropping frames.

The pre-processor 310 performs a variety of functions, including packet verification and discarding, packet protocol identification, statistics compilation, and others. The packet protocol identification includes classifying the type of frame that has been received. The pre-processor identifies each layer protocol using a multistage algorithm coupled with a content-addressable memory (CAM) and memory (such as an SRAM) for resolving protocols. The frame is then stored in a memory along with the result of the preprocessor, i.e., the protocol layer code.

The parsing engine 312 performs layer classification and tagging via a search engine. The various functions of the parsing engine 312 includes parsing the frames processed by the pre-processor and generating search keys from data anywhere within the frame. The protocol layer code is used as a start vector into an instruction memory, which contains instructions for the parsing engine 312 and pointers to access selected words in a frame buffer. The parsing engine 312 receives the instruction and performs the functions selected by the corresponding instruction operational code. The results are used with an extractor that builds search keys which can be applied against a CAM (or indexed directly to a memory) to generate "search results" that contain the frame classification. Such parsing/classifying may be performed in a manner described herein and in copending U.S. patent application Ser. No. 09/849,913, entitled "A METHOD AND APPARATUS FOR PROVIDING MULTI-PROTOCOL, MULTI-STAGE, REAL-TIME FRAME CLASSIFICATION," assigned to the assignee of the instant application, the contents of which are incorporated herein by reference in its entirety.

The policing engine 313 performs a variety of functions, including ensuring flow conformance to a maximum allowed peak rate and a contractually obliged committed rate flow, e.g., DiffServ IP and MPLS. The policing engine 313 works with memory, such as policing RAM 315 which stores parameters for each connection. The policing engine, the subject of the present invention, is described in greater detail below.

The editor 314, also referred to as a packet transformation engine, utilizes the search results to index the appropriate editing instructions to be executed by an editing module. The editor 314 facilitates execution of multiple edits or "transformations" per packet as streaming data of various networking protocols associated with different networking layers is input into the editing module. The editor 314 supports comprehensive packet manipulation capability, including full MPLS labels, operations such as multiple push and pop operations, as well as traditional routing operations such as TTL edits, checksum edits, and other routing operations. As described more fully below, the editor 314 carries out the policing edits required by the policing engine's enforcement of a QoS.

The labeled traffic is ultimately directed to the switch fabric interface 316 through one or more traffic directors 318, 320 and output buffer 322. The traffic director 318 accepts frames from the editor 314, which are then passed to an output buffer 322 and/or the processor buffer 340 via the interface 341. Traffic director 320 accepts frames from the output buffer 322 and the processor transmit buffer 342, and passes the frames to the OIF interface 344 to the switch fabric interface 316.

Figure 4:
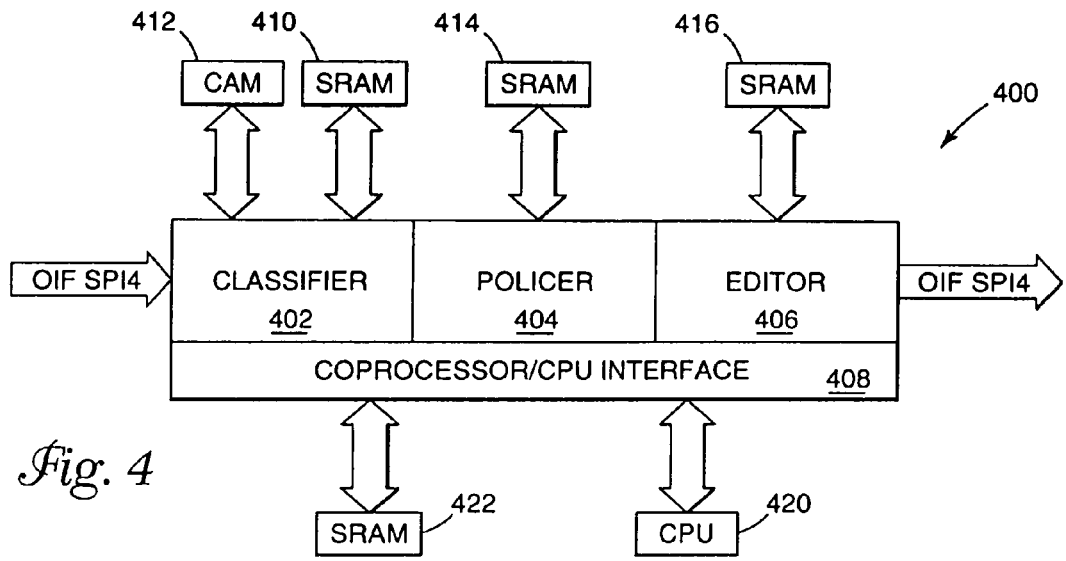
FIG. 4 is a block diagram illustrating selected functional blocks of an ingress processing system in accordance with the invention.

FIG. 4 is a block diagram illustrating selected functional blocks of an ingress processing system such as that described in connection with FIG. 3. The ingress processing system 400 of FIG. 4 illustrates the classifier functional block 402, the policer functional block 404, and the editor functional block 406. As described above, the classifier 402 builds queries (search words) to directly index a memory such as SRAM 410, or alternatively may search against a CAM 412 which in turn provides addresses to the SRAM 410. The SRAM identified in FIGS. 4 and 5 are shown for illustrative purposes only, as any memory may be used rather than SRAM.

The policer 404 performs a variety of functions, including ensuring flow conformance to a maximum allowed peak rate and a contractually obliged committed rate flow, e.g., DiffServ IP and MPLS. The policer 404 works with memory, such as SRAM 414 which stores parameters for each connection. The editor 406 supports policing results and makes other appropriate modifications to the packet before being output from the ingress processing system 400. An external memory, such as SRAM 416, may be used to store the editor instructions. The coprocessor/CPU interface 408 provides for coprocessor/CPU support via interface 408, thereby allowing processor control, configuration, etc., of the classifier 402, policer 404, and editor 406. The interface 408 allows the system 400 to be coupled to a coprocessor and/or other CPU such as CPU 420, and to memory such as SRAM 422. In this manner, the ingress processing system 400 receives incoming packets, classifies and parses the packets according to predetermined criteria such as protocol, enforces policing functions on the packets, and modifies the packets accordingly before outputting the packets to the switch fabric.

In one embodiment of FIG. 4, the classifier 402, policer 404, editor 406, and coprocessor/CPU interface 408 are all provided on a single chip. The unique architecture combines the three key functions of classifying, policing and editing the data all through the tightly coupled arrangement facilitated by the integration into a common chip.

Figure 5:
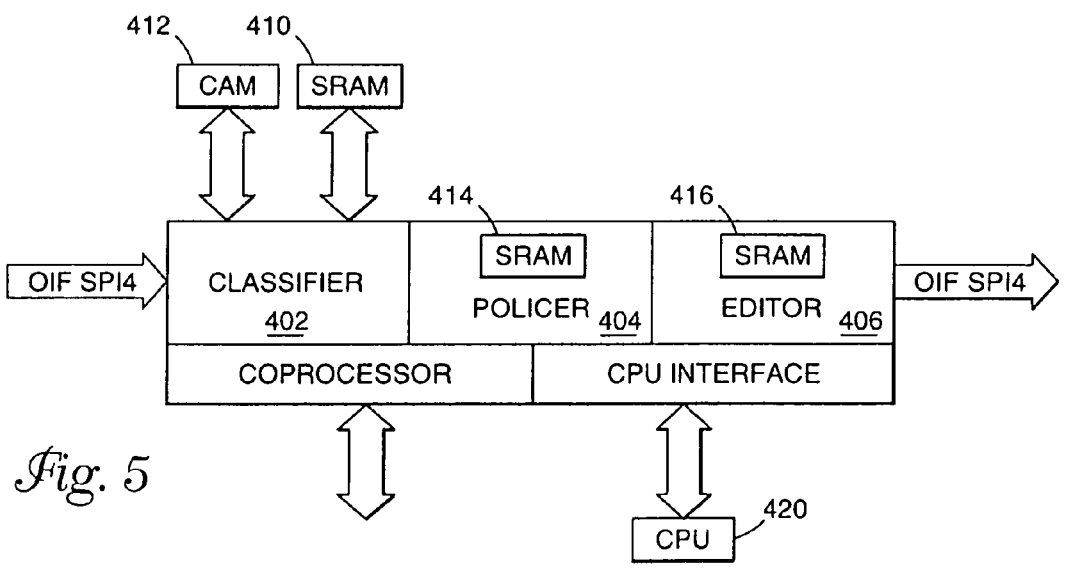
FIG. 5 is a block diagram illustrating selected functional blocks of an ingress processing system utilizing embedded memory in accordance with the invention.

It should be recognized that the buffers and memory identified in FIG. 4 may also be incorporated into the common chip, as shown in the embodiment of FIG. 5. In FIG. 5, the SRAM 414 is integrated with the policer 404, the SRAM 416 is integrated with the editor 406, and so on. Embedding these memories on the chip provides a lower chip count solution and increased "per flow" statistics. Again, it should be recognized that the embedded SRAMs may be any type of memory rather than SRAM technology. For example, in one embodiment of the invention, the embedded memory is a dynamic RAM (DRAM).

Figure 6:
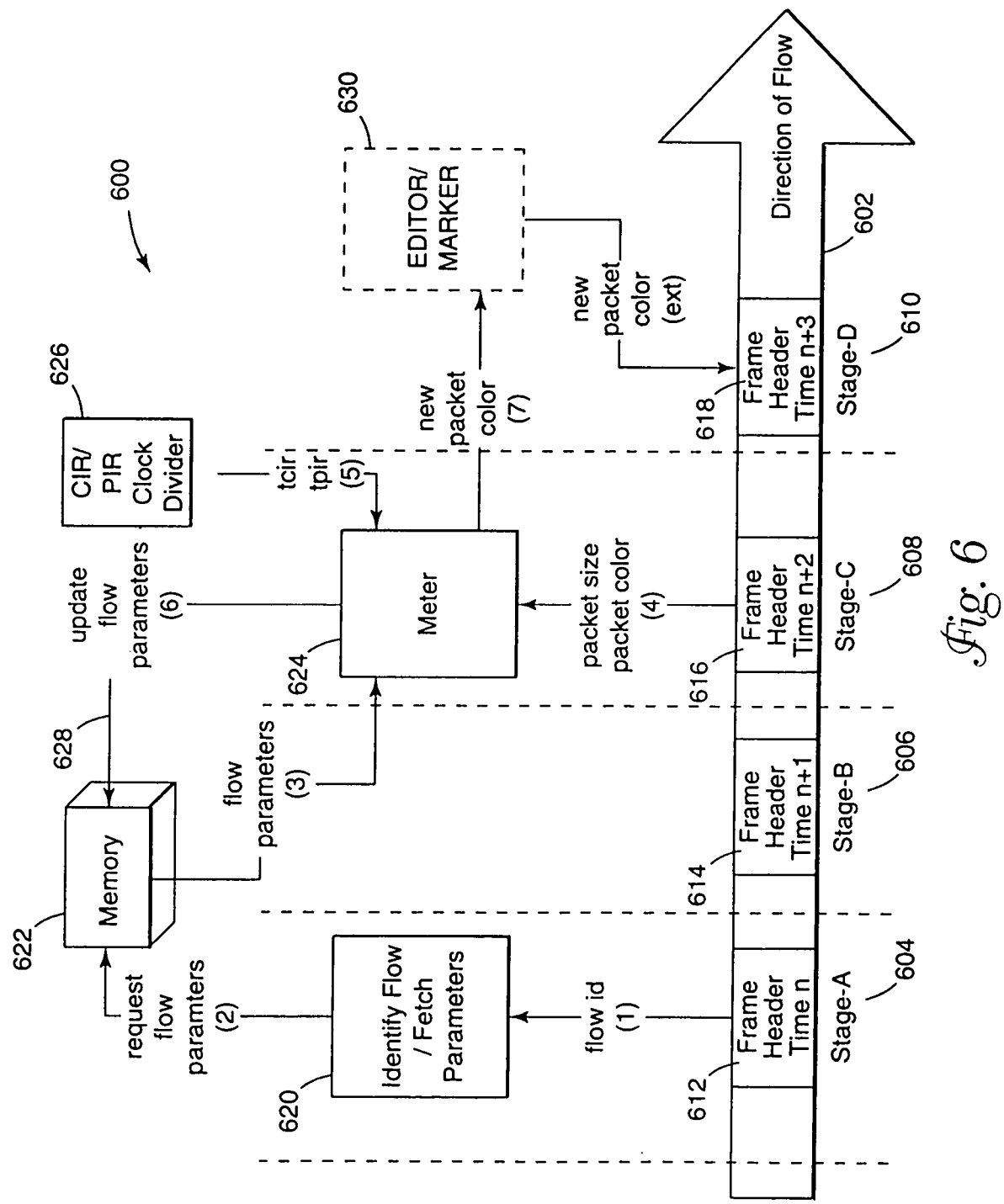
FIGS. 6 and 7 provide a block diagrams of embodiments of a policing module in accordance with the principles of the present invention.

Turning now to the policing functionality, FIG. 6 provides a block diagram of an embodiment of a policing module 600 in accordance with the present invention. The policing engine 600 is an N-flow policing implementation, where the N-flows arrive multiplexed in a single stream. Each flow is treated by the policing engine 600 independent of other flows, that is, the individual flows of the multiplexed stream will be individually policed. For example, a first flow having a low data rate should result in packet conformance (e.g., green-marked packets in the context of the color marker system), even if other flows in the multiplexed stream exceed conformance thresholds (e.g., exceed the committed information rate CIR and result in non-green packets under the color marker system).

The policing engine 600 meters and marks the data stream packets. In one embodiment, each packet is wrapped within a local header. The logical flow identifier, packet size, and the DS fields are all available in the start of the frame word. An upstream module, such as the classifier 402 shown in FIG. 4, classifies/parses the incoming stream into separate logical flows, with the flow identifier embedded in the local header. Alternative embodiments may also be employed, such as storing the flow identifier, packet size, packet color, or any other parameters in a memory, and accessing the stored parameters to identify the flow, packet size, packet color, etc.

Arrow 602 of FIG. 6 represents the direction of the incoming data stream. The embodiment of FIG. 6 also provides an illustrative example of the cycles involved in a pipelined approach, although any pipelined or even non-pipelined approach may be implemented. For example, the illustrated embodiment uses a four-stage pipelined approach, shown as stage-A 604, stage-B 606, stage-C 608, stage-D 610. In this exemplary embodiment, a particular frame header propagates through the pipeline such that the frame header is at stage-A 604 at time n 612, stage-B 606 at time n+1 614, stage-C 608 at time n+2 616, and stage-D 610 at time n+3 618. Each "time" corresponds to a clock cycle. Again, this represents an exemplary embodiment, and the invention is clearly not limited thereto. For example, each of the stages, including the identification, metering, and marking stages, may be separated and may be performed in parallel, or alternatively may be performed in series with no pipelining.

Upon arrival of a frame header, the flow is identified, as shown at block 620. As previously indicated, an upstream classifier module classifies the incoming stream into separate logical flows, and assigns a flow identifier. A flow identifier can be stored as a flag, or may include some other appropriate identification process, such as in accordance with an exemplary embodiment where the flow identifier is embedded into a local header. In such an embodiment, a packet is classified as belonging to the flow if this identifier appears in the start of a frame word, and there should only be one entry for each supported flow. The flow can then be identified 620 by reading the embedded flow identifier in the local header. Packets with unrecognized identifiers will be marked appropriately, such as by marking as "red."

The present invention is applicable to data streams of multiple flows, regardless of what constitutes a "flow." For example, individual packets making up a data traffic stream can be classified into a variety of different "flows" or "connections." Generally, this classification is based on the original sender of the packet (e.g., an IP source address), the ultimate receiver of the packet (e.g., an IP destination address), or both. However, it should be recognized that the present invention is applicable to different flows regardless of the criteria defining a flow. Thus, flows can be determined by monitoring any particular field of a packet header. For example, a flow could be based on packet sizes, or packet type. In a more specific example, a flow could be based on the packet type, such as whether the packet is an IP packet or a FAST packet. In this manner, quality of service can be based on the type of packet. This may be particularly useful in an implementation where a particular packet type is to receive a higher priority than another packet type. Certainly priority fields in a header would also be a logical place in which to classify flows, as a packet priority may be a direct representation of the quality of service expected by the particular packet. Flows can also be based on multiple criteria, such as a source address and the packet type. In any event, the present invention may be used in connection with any multiple-flow data stream, regardless of the manner in flows are categorized.

Parameter fetching is also associated with block 620. A request for flow parameters is issued to the memory 622. In response, the memory 622 provides the requested flow parameters for the particular flow ID. In one embodiment, these flow parameters include the token count and the Last Pass Time (LPT) variables. In the pipelined example of FIG. 6, the memory 622 accesses and provides the requested parameters during stage-B 606.

The packet frame headers are also analyzed by the meter 624 for packet size and current color, as shown at stage-C 608. The packet size refers to the size of the IP packet, and may include a constant size or a variable range of sizes. The current packet color refers to a previously marked color of the IP packets, such as red, yellow or green as marked in accordance with an srTCM, trTCM or similar policing methodology. The meter 624 also receives the requested flow parameters from the memory 622. The meter 624 determines the current time from two clocks 626, one running at the committed information rate (CIR) and the other running at the peak information rate (PIR). The flow parameters can then be updated, as shown by the return path 628 from the meter 624 to the memory 622.

The meter 624 is configured to process the information by applying an appropriate operation, determining the packet conformance identifiers such as a Differentiated Services (DiffServ) color to apply to the packet, and providing the new packet color to the editor/marker 630. In one embodiment, the editor/marker 630 is not part of the policing module 600, as represented by the dashed lines around the editor/marker 630, although this editing function may be incorporated into such a policing function.

Using the current packet conformance indicator (e.g., color) and size obtained from the packet frame header, the time of arrival, number of token counts and last pass times, the meter 624 can apply the appropriate operation. In one embodiment, the appropriate operation is selected and performed by selecting an appropriate algorithm to execute, where such algorithm may be implemented in hardware, software, or a combination thereof. The various algorithms that may be selected from, and applied, are described in greater detail in the ensuing description.

The editor/marker 630 represents an editing module such as the editor 406 of FIG. 4. Marking may be performed in a manner known in the art. In a more particular embodiment, a macro sequencer implemented within the editing module provides the marking function. Such marking based on policing results may be performed in a manner described herein and in copending U.S. patent application Ser. No. 09/849,804, entitled "SYSTEM AND METHOD FOR PROVIDING TRANSFORMATION OF MULTI-PROTOCOL PACKETS IN A DATA STREAM," assigned to the assignee of the instant application, the contents of which are incorporated herein by reference in its entirety. The editor/marker 630 therefore receives the new packet conformance identifiers (e.g., colors) from the marker 624, and modifies the packet as represented by the frame header 618 at time n+3.

The exemplary policing module 600 can therefore providing policing on multiple flows, by determining which flow each packet is associated with, and carrying out an appropriate operation depending on the type of flow to which the packet belongs. This allows the policing module 600 to be used generically in a system, such as a router, switch, bridge, etc., even where multiple network protocols are used.

Thus, support for multiple flows in a single stream is realized by having the flow variables in addressable memory 622 and having an identification and variable fetch step prior to metering. The flow variables stored in the memory 622 depend at least in part on the classification of the flow. In a more specific example, the policing module 600 may be used in connection with packets having multiple marker types including srTCM, trTCM, and F-GCRA. In such an embodiment, the meter 624 implements srTCM, trTCM and a dual rate F-GCRA independently for each flow. For certain marker types, such as srTCM, certain variables are set to predetermined values, such as CIR=PIR, and PBS is set to a value equal to the CBS plus the desired EBS (excess burst size). An example of the configurable parameters that would be used per flow in such an embodiment is provided in Table 1.

TABLE 1

| PARAMETER | DESCRIPTION |
| --- | --- |
| CIR | The Committed Information Rate in bytes per second |
| CBS | The Committed Burst Size in bytes |
| PIR | The Peak Information Rate in bytes per second |
| PBS | The Peak Burst Size in bytes |
| Marker Type | srTCM; trTCM or F-GCRA |
| Color Awareness | Color blind; Color aware |
| Flow ID (Address) | Identifier for a flow |

Referring to Table 1, the CIR parameter is the Committed Information Rate in bytes per second, and is referenced by both srTCM and trTCM metering. The CBS parameter is the Committed Burst Size in bytes, and is also referenced by both srTCM and trTCM metering. The CBS is greater than the largest IP packet size. The PIR parameter is the Peak Information Rate in bytes per second, and is referenced by trTCM metering. The PBS is the Peak Burst Size in bytes, and is greater than the largest packet size. The excess burst size (EBS), as defined in srTCM, is equal to the PBS minus the CBS.

In the embodiment illustrated in Table 1, there are three Marker Types, including srTCM, trTCM, and F-GCRA. Other embodiments may include different marker types. The Color Awareness parameter identifies which mode the meter will operate in, including a color blind mode and a color aware mode. In color blind mode, the meter assumes that the packet stream is uncolored, whereas in color aware mode the meter assumes that the incoming packet stream has already been colored. The flow ID is the identifier for a flow. A packet is classified as belonging to the flow if this identifier appears in the start of the frame word. There should be one entry for each supported flow. All packets with unrecognized identifiers will be given the color red.

Figure 7:
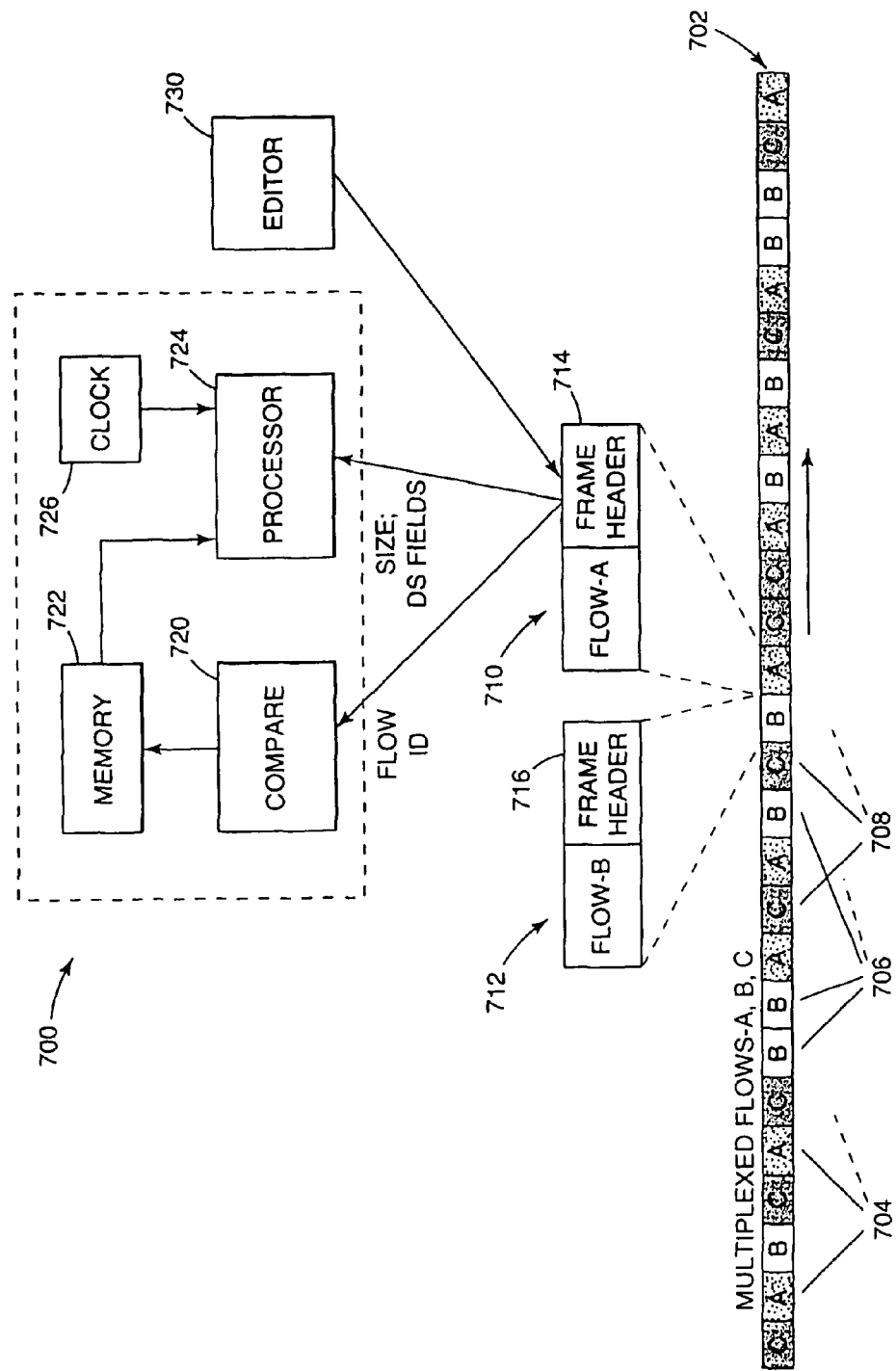

FIG. 7 is a block diagram illustrating another embodiment of a policing system 700 in accordance with the principles of the present invention. FIG. 7 illustrates that individual packets form a single communications traffic stream 702, and are classified into several flows, shown as flows A 704, B 706, and C 708. This classification may be based on the original sender of the packet, the ultimate receiver of the packet, or both. As described above, other criteria may be used to classify flows. Different qualities of service can be committed per flow by metering packets arriving at a given interface on a flow-by-flow basis. Flows whose effective bit rate exceeds what is committed in the service contract will be classified as non-conforming, which will have a higher likelihood of being discarded than conforming packets.

In the embodiment of FIG. 7, three flows A 704, B 706, C 708 are identified. It should be noted that the data stream 702 may comprise any number of different flows. Two example packets 710, 712 are illustrated, where packet 710 is associated with flow-A 704, and packet 712 is associated with flow-B 706. In one embodiment of the invention, each packet is wrapped in a local header, shown as frame header 714 for packet 710 and frame header 716 for packet 712. The logical flow identifier, packet size, DS fields, and the like may all be provided in the frame header 714, 716.

The example embodiment of FIG. 7 illustrates that the policing engine 700 receives the flow ID at a compare module 720, which compares the input flow ID to stored flow IDs. Alternatively, the compare module may represent a content addressable memory (CAM) that receives the input flow ID and outputs an appropriate address to the memory 722 to retrieve the desired flow parameters corresponding to the indexed flow ID. The memory 722 provides the information to a processing module 724, that also receives input from a clock module 726. In this manner, the processor can analyze the flow parameters retrieved from the memory 722 as they relate to the clock 726 signals. More particularly, the processor can determine certain flow rates, such as committed flow rate, peak rates, token counts, last pass times, etc., as they relate to the current "time" provided by the clock 726. In one embodiment, the processor uses a number of clock 726 "ticks" to compare against the flow parameters to appropriately meter the flows. The processor 724 may then pass the resulting information to an editor 730, where the resulting information is a potentially updated conformance indicator for the packet 710 under consideration. The editor 730 then edits the packet 710 to reflect the updated conformance indicator, such as, for example, changing a drop priority from green to yellow or yellow to red in a color marking scheme such as srTCM or trTCM.

Different packet protocols often utilize different policing methods. For example, F-GCRA is a policing method provided in the ATM Forum's specification of FAST packets. However, with F-GCRA, packets can be variable in size, and a very large packet will pass as conforming if a long enough period precedes it since the time the last packet from the same flow arrived. Thus, with F-GCRA, as long as the 30 packet arrives with a certain time after the previous packet from the same flow, the packet will be classified as conforming no matter how large the packet is. However, it would be desirable to include the arriving packet's size in determining its conformance, and to ultimately provide a policing methodology that may be used for variable length IP packets or FAST frames. For FAST packets, the number of ATM cells contained in the packet determines the "size" of the arriving FAST packet. One aspect of the present invention utilizes this parameter to provide a burst regulated policing methodology that may be used for FAST packets or any other packets having the analogous characteristics in which policing is based. In this embodiment, the size of the arriving FAST packet (or characteristically analogous packet) is used to determine conformance.

Figure 8:
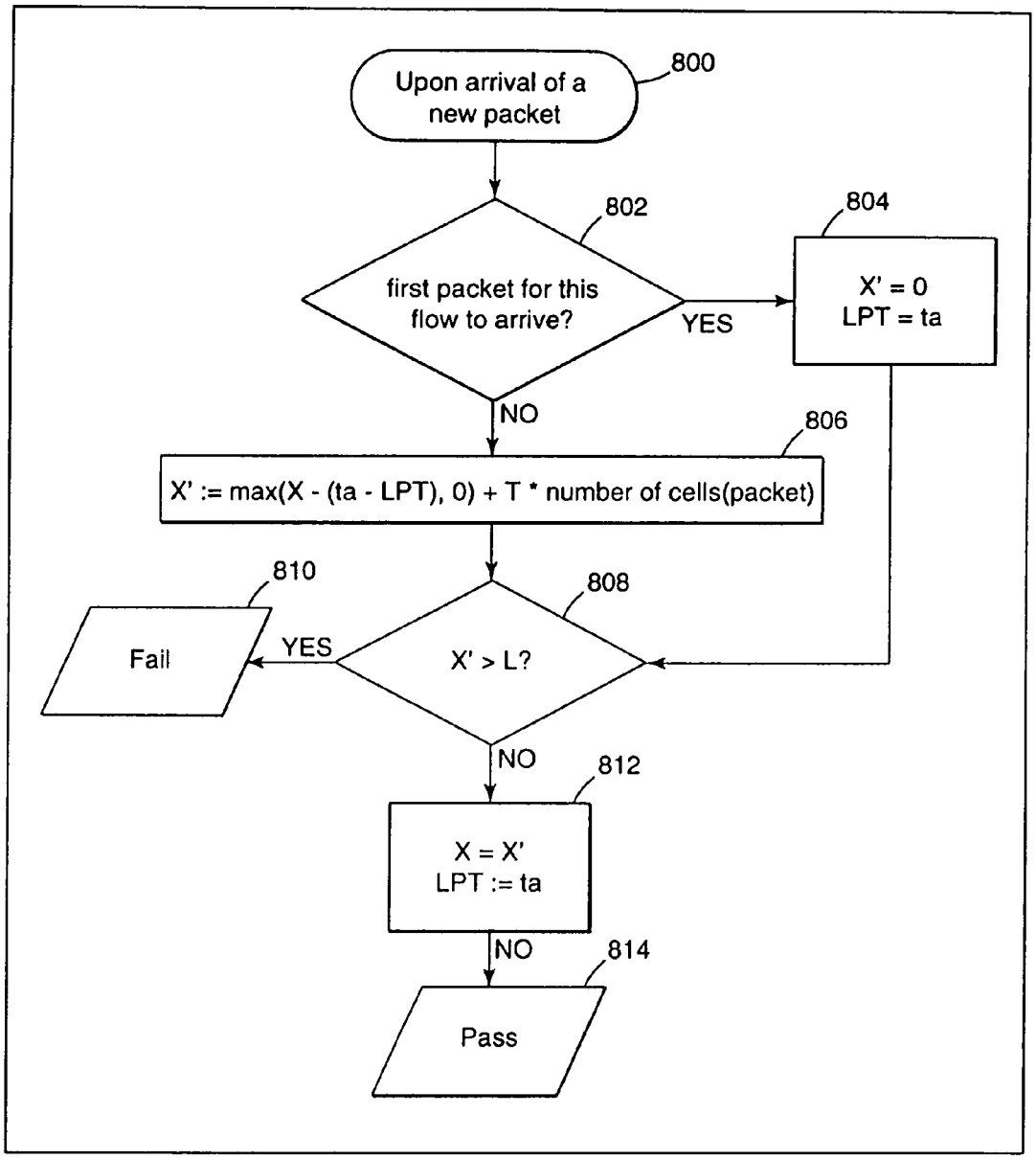
FIG. 8 illustrates one embodiment of a burst regulated policing methodology.

The flow diagram of FIG. 8 illustrates one embodiment of such a burst regulated policing methodology. The variables described in connection with the flow diagram of FIG. 8 are presented in Table 2 below:

TABLE 2

| VARIABLE | DESCRIPTION |
| --- | --- |
| X | current value of leaky bucket counter |
| LPT (last pass time) | last recorded time an arriving packet is determined to be conforming |
| T | configurable parameter inversely proportional to the committed cell rate for the flow |
| L | configurable reference limit for the flow |
| ta | current time |
| X' | auxiliary variable |
| number_of_cells(packet) | number of cells needed to carry the packet's payload. |

As shown in Table 2, the variable X denotes the current value of the leaky bucket counter, and X' is an auxiliary variable. The LPT is the last pass time, that corresponds to the last recorded time that an arriving packet is determined to be conforming. T is a configurable parameter that is inversely proportional to the 20 committed cell rate for the flow, and L is a configurable reference limit for the flow. The variable "ta" corresponds to the current time, and the variable "number_of_cells(packet)" refers to the number of cells needed to carry the packet's payload. For example, in one embodiment, FAST packets include a number of ATM cells within the packet. The "number_of_cells(packet)" in such an example would identify the number of ATM cells required to carry the packet's payload. Since ATM payloads include forty-eight octets (i.e., bytes), the "number_of_cells(packet)" would be the number of forty-eight byte cells required to carry the payload, plus an additional cell for any remaining number of cells between one and forty-seven bytes. For example, if the FAST packet had two hundred bytes, the "number_of_cells(packet)" would be five, as four ATM cells each carry forty-eight bytes, and an additional ATM cell carries the remaining eight bytes.

Referring to FIG. 8, upon arrival of a new packet 800, it is determined 802 whether this is the first packet to arrive for this particular "flow." If so, then X' is assigned to zero to reset the value, and LPT is the current time "ta" to reset the LPT to indicate that the last time a packet is determined to be conforming is reset to the current time. These variable resets are shown at block 804.

If it is not the first packet for the particular flow, then a determination as to whether or not the packet is conforming is made, as seen at block 806. At block 806, a maximum of X-(ta-LPT) and 0 is determined. "ta-LPT" represents the time differential between the current time and the last time that an arriving packet was determined to be conforming. X-(ta-LPT) thus represents the differential value of the leaky bucket counter during the time differential (ta-LPT). A "leaky bucket" counter refers to a data count value corresponding to the data volume in a buffer, where the buffer releases data therefrom, but has a maximum capacity which if exceeded results in packet being discarded or at least being placed at risk of being discarded. The operation of block 806 includes determining the maximum of this differential value of the leaky bucket counter and zero. The resulting value is added to T*number_of_cells(packet). "T," a configurable parameter, is inversely proportional to the committed cell rate (e.g., committed information rate CIR) for the flow. This parameter may be viewed as a number of tokens per cell, and the product of T and the number of cells in the packet can be considered the "fare" being charged for the admission of the packet.

Thus, X' is assigned to the greater of zero and the differential value of the leaky bucket counter, added to this "fare" for admission of the packet.

"L" represents the burst limit for the flow, and if X' is greater than L as determined at decision block 808, the packet is nonconforming as shown by block 810. If X' is not greater than L, then X is assigned to the value of X', and LPT is assigned to the current time ta as shown at block 812, and the packet is deemed conforming as shown at block 814.

The aforementioned policing methodology of FIG. 8 describes one embodiment of how FAST packets, or packets having characteristics of FAST packets, may be subjected to traffic policing. The embodiment of FIG. 8 utilizes a pass/fail methodology, as F-GCRA does. For other packet protocols the policing methodology may differ, although the present invention accommodates policing of various packet protocols. For example, IP is a predominant packet transfer protocol, as is IP on MPLS, and other existing protocols. Further, new protocols are likely to be developed over time, and the present invention may be applied to existing and future protocols.

For IP, the two-rate, three-color marker (trTCM) methodology polices flows against a committed level and a peak level. Both levels have configurable parameters for the bit rate and burst tolerance. Packets conforming to both levels are marked green, packets conforming only to the peak level are marked yellow, and non-conforming packets are marked red. Two credit buckets are used to police flows against the two levels. The rate of credit increments and the size of the credit bucket determine the reference bit rate and burst size for each level. trTCM can operate in color-aware mode, where the current color of an arriving packet is taken into consideration. In color-aware mode, a packet can only be downgraded, from green to yellow or red, or from yellow to red. Other marker systems using different conformance indicators may provide analogous indicia of conformance. A traffic shaper or other scheduling system will analyze the color of the packet, and forward, attempt to forward, or drop packets depending on the color or other conformance indicia. For example, a traffic shaper may always forward green packets, forward or drop yellow packets based on congestion levels, and drop all red packets.

It would be desirable to combine the burst regulated policing methodology described in connection with FIG. 8 with a color-based policing methodology such as trTCM. In order to do this, the burst regulated policing methodology described herein is first transformed from a leaky bucket-based system to a credit bucket-based system.

Figure 9:
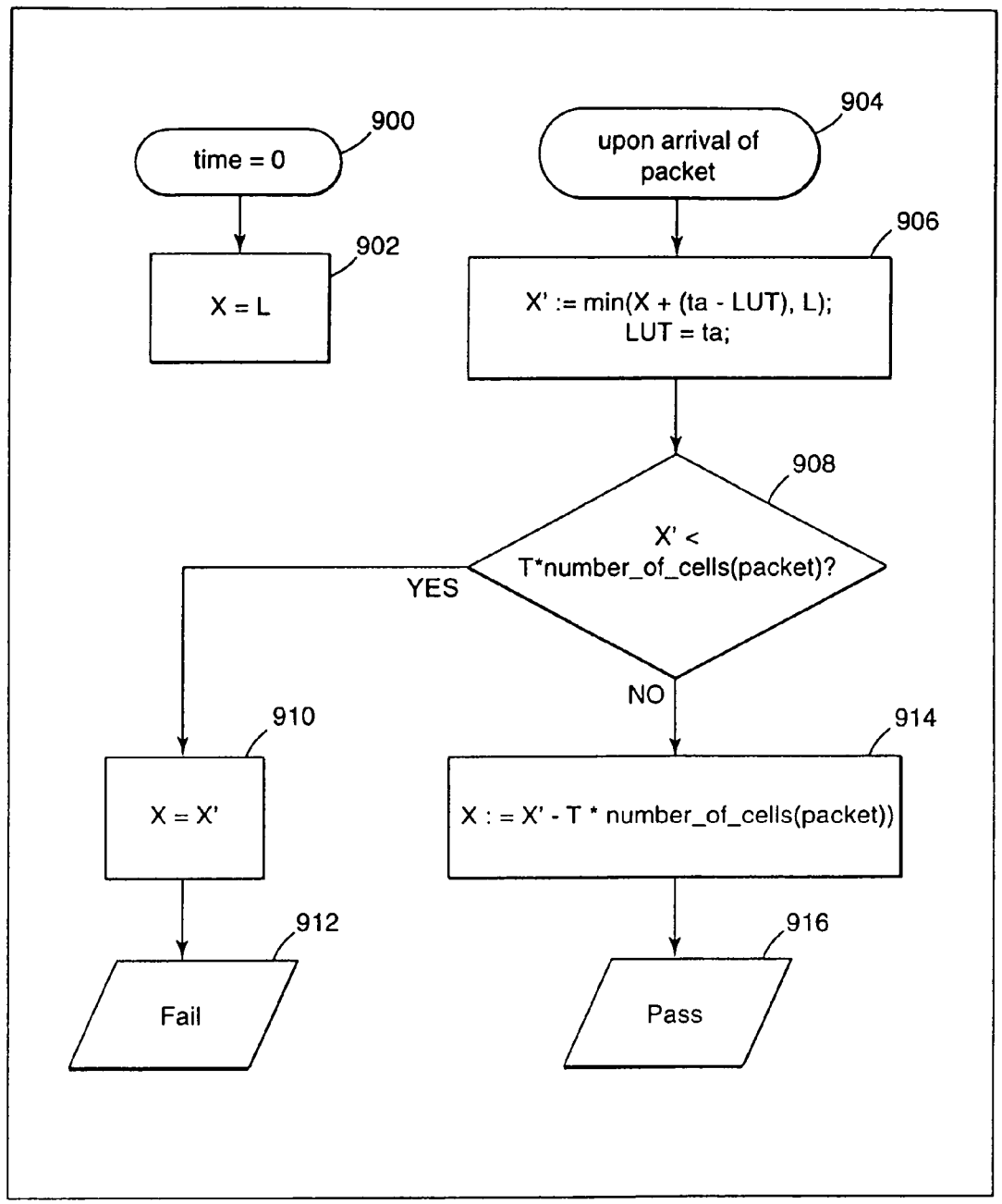
FIG. 9 is a flow diagram of a credit bucket version of the burst regulated policing methodology.

Referring now to FIG. 9, a flow diagram is provided of a credit bucket version of the burst regulated policing methodology. At time=0 900, X is set to L, as shown at block 902. Upon arrival of a packet 904, block 906 illustrates that X' is assigned to the minimum of L and (X+(ta-LUT)), where LUT denotes the last time the buckets for this flow were updated, in system clock ticks. Where "ta" is the current time in system clock ticks, "ta-LUT" results in a number of clock ticks corresponding to the time passed since the last bucket update. So, the change in X resulting from the time passage since the last bucket update is compared to L to determine the minimum. Then the time of the last updating of the buckets (LUT) is set to the current time ta.

It is determined 908 whether X' is less than T*number_of_cells (packet). As described above, "T" is a configurable parameter that is inversely proportional to the committed cell rate for the flow. This parameter may be viewed as a number of tokens per cell, and the product of T and the number of cells in the packet can be considered the "fare" being charged for the admission of the packet. Thus, if X' is less than this "fare" being charged, then X=X' as shown at block 910, and the packet fails 912, and is marked nonconforming. If X' is greater than or equal to the fare (i.e., the product of T and the number of cells in the packet), then X is assigned to the result of X' minus this "fare" as shown at block 914. In other words, the value of X is reduced by the fare, but the packet passes 916.

Figure 10:
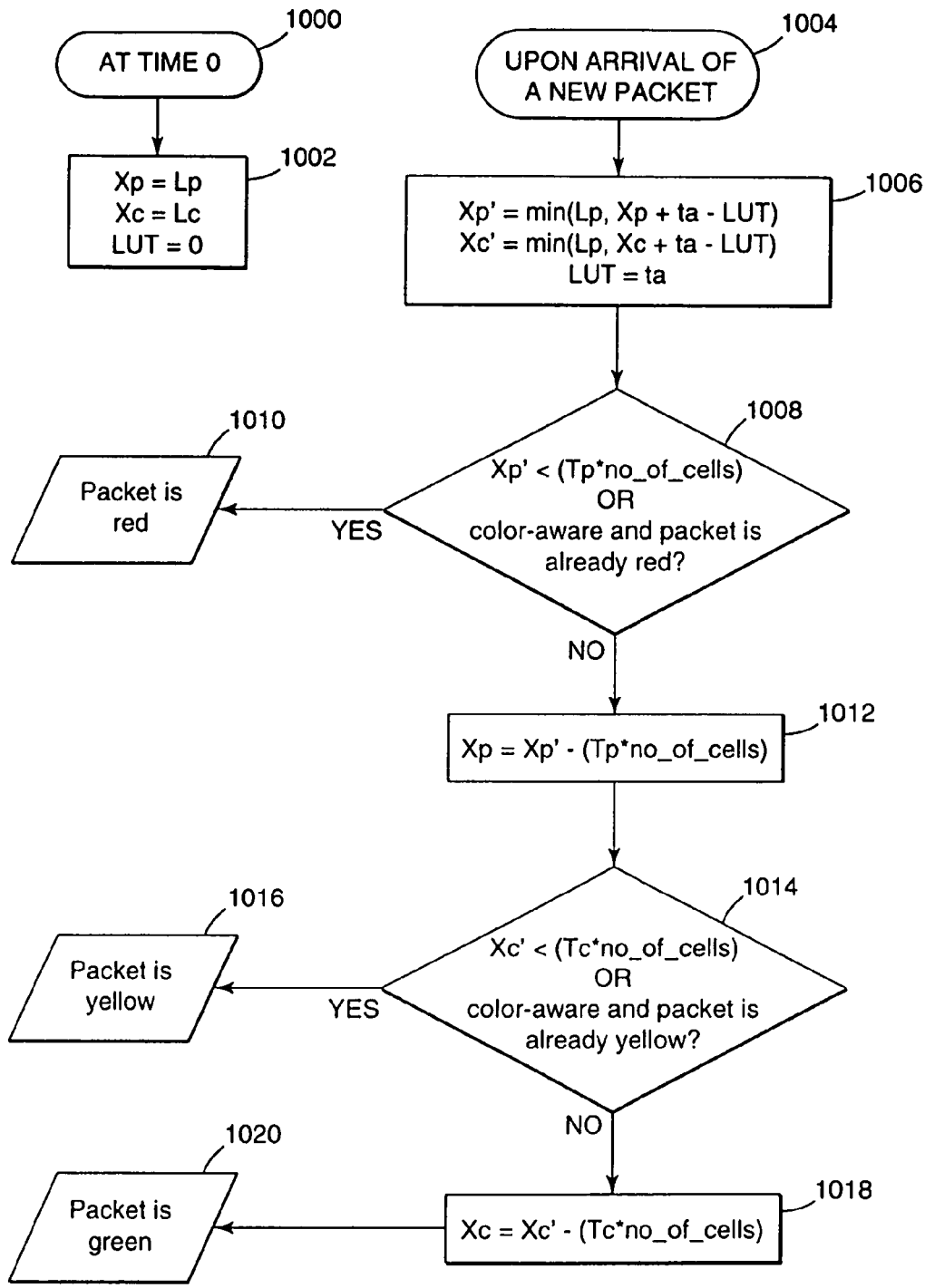
FIG. 10 is a flow diagram of a two-rate, three color version of the credit bucket, burst regulated policing method.

A two-rate, three color flavor of the credit bucket version of the burst regulated policing method is illustrated in FIG. 10. In this exemplary embodiment, the burst regulated policing method for policing FAST packets is essentially combined with a trTCM approach.

The variables described in connection with the flow diagram of FIG. 10 are presented in Table 3 below:

TABLE 3

| VARIABLE | DESCRIPTION |
| --- | --- |
| Xp | current value of peak bucket counter |
| Xc | current value of committed bucket counter |
| Xp' | auxiliary variable for peak bucket counter |
| Xc' | auxiliary variable for committed bucket counter |
| LUT | the last time the committed and peak buckets were updated, in system clock ticks |
| Lp | configurable peak reference limit for the flow |
| Lc | configurable committed reference limit for the flow ta current time |
| no_of_cells | number of cells needed to carry the packet's payload |
| Tp | parameter inversely proportional to the peak cell rate |
| Tc | parameter inversely proportional to the committed cell rate |

As shown in Table 3, the variable Xp denotes the current value of the peak bucket counter, and Xc is the current value of the committed bucket counter. Xp' and Xc' are auxiliary variables for the peak and committed bucket counters respectively. LUT represents the last time that the committed and peak buckets were updated, in system clock ticks. Lp and Lc are configurable peak and committed reference limits, respectively, for the flow. "ta" is the current time, in system clock ticks, and no_of_cells is the number of cells needed to carry the packet's payload.

Referring now to FIG. 10, at time=0 1000, Xp is set to Lp, Xc is set to Lc, and LUT is set to zero, as shown at block 1002. Upon arrival of a packet 1004, block 1006 illustrates that Xp' is set to a minimum of Lp, and Xp+ta-LUT. The function Xp+ta-LUT corresponds to the change in the value of the peak bucket counter since the last time that the peak bucket counter was updated. Similarly, Xc' is set to a minimum of Lc, and Xc+ta-LUT. The function Xc+ta-LUT corresponds to the increased value of the committed bucket counter since the last time that the committed bucket counter was updated. LUT is set to the current time, since the values of the committed and peak buckets have been updated.

If Xp' is determined 1008 to be less than the Tp times the number of cells in the packet's payload, then the packet is marked red 1010. Further, if it is determined 1008 that the packet color is already red, and the policing is operating in a color-aware mode, the packet will remain marked red as shown at block 1010. If Xp' is not less than Tp*no_of_cells, and the packet is not already marked red in a color-aware mode, then Xp is set to Xp' minus the product of Tp and the number of cells in the packet's payload, as shown at block 1012.

If Xc' is determined 1014 to be less than Tc times the number of cells in the packet's payload, then the packet is marked yellow 1016. Further, if it is determined 1014 that the packet color is already yellow, and the policing is operating in a color-aware mode, the packet will remain marked yellow as shown at block 1016. If Xc' is not less than Tc*no_of_cells, and the packet is not already marked yellow in a color-aware mode, then Xc is set to Xc' minus the product of Tc and the number of cells in the packet's payload as shown at block 1018, and the packet is marked green 1020.

The present invention utilizes these derived methodologies to provide a generalized, dual rate, three-color method of policing variable length packets of multiple protocols, such as both IP packets and FAST frames. This method of policing allows a single apparatus to police multiple flows and coexisting flows of FAST and IP packets. Each flow can be configured as an IP flow and police its packets using a two rate, three color marker, or as a FAST flow and police its frames using the two rate burst regulated F-GCRA described herein.

Figure 11:
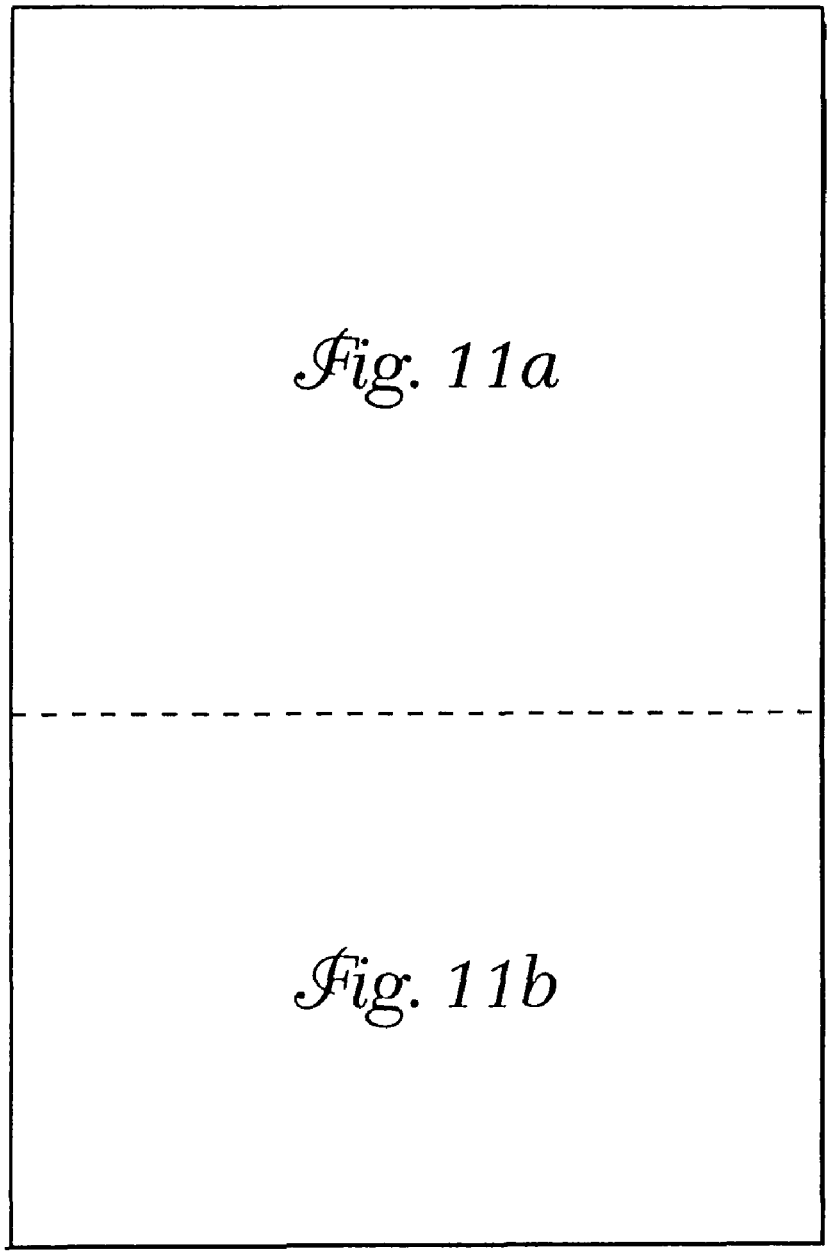
FIG. 11 is a flow diagram illustrating one embodiment of a methodology according to the invention where a common policing operation can service multiple traffic protocols.
Figure 11A:
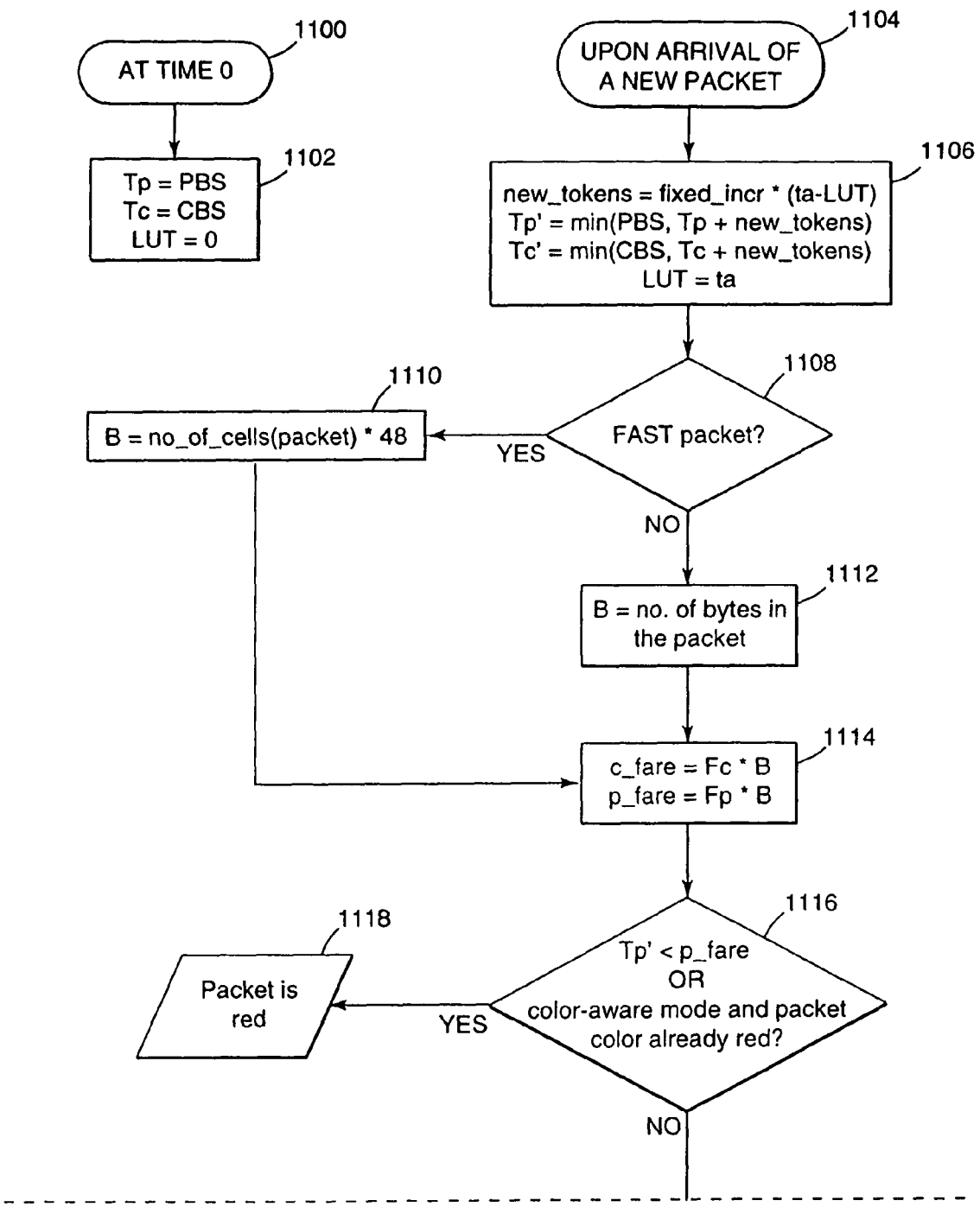
Figure 11B:
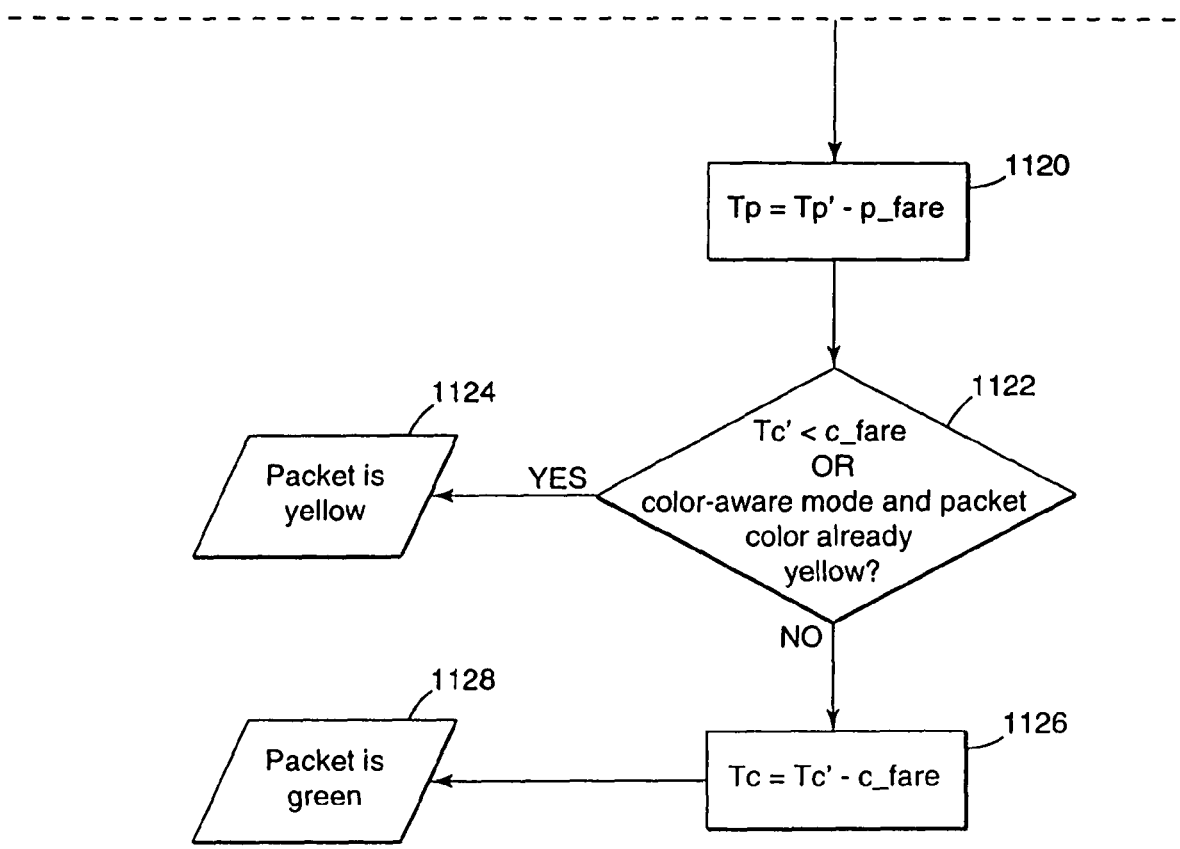

FIG. 11 is a flow diagram illustrating one embodiment of a methodology according to the invention where a common policing operation can service multiple traffic protocols. More particularly, the example embodiment of FIG. 11 can service both FAST and IP traffic. The common policing methodology also facilitates the creation of a common forwarding engine for both FAST and IP traffic.

The variables described in connection with the flow diagram of FIG. 11 are presented in Table 4 below:

TABLE 4

| VARIABLE | DESCRIPTION |
|---|---|
| Tc | current number of committed rate tokens |
| Tp | current number of peak rate tokens |
| LUT | the last time the Tc and/or Tp for this flow was updated, in system clock ticks |
| Fc | a fee factor inversely proportional to the CIR; high-rate connections are charged fewer tokens for each byte in a packet |
| Fp | a fee factor inversely proportional to the PIR; high-rate connections are charged fewer tokens for each byte in a packet |
| CBS | committed burst size |
| PBS | peak burst size |
| ta | current time in system clock ticks |
| fixed_increment | number of tokens that flow into the buckets in each clock tick, and is the same for all flows; allows adoption of different real time clock speeds or different acceptable rate ranges |

As shown in Table 4, the variables Tc and Tp denote the current number of committed rate and peak rate tokens respectively. The LUT represents the last time the Tc and/or Tp for this flow was updated, in system clock ticks. The Fc and Fp represent fee factor (i.e., the fare being charged for admission of the packet) that is inversely proportional to the CIR and PIR respectively. High-rate connections are charged fewer tokens for each byte in a packet. The CBS and PBS are the committed burst size and peak burst size respectively, and "ta" is the current time in system clock ticks. The variable "fixed_increment" is the number of tokens that flow into the buckets in each clock tick, and is the same for all flows. This variable is the vehicle by which the methodology can be adopted to different real time clock speeds or different acceptable rate ranges.

Fc, Fp, CBS and PBS are per-flow configurable parameters. Fc and Fp are configured in place of the CIR and PIR. If the CIR and PIR are in bits per second, then Fc and Fp relate to the CIR and PIR as shown in Equations 1 and 2 below:

$$Fc = 8 * \text{fixed\_increment} * (\text{system\_ticks\_per\_second} / CIR) \quad \text{Eq. 1}$$

$$Fp = 8 * \text{fixed\_increment} * (\text{system\_ticks\_per\_second} / PIR) \quad \text{Eq. 2}$$

With this information regarding the variables, reference is again made to FIG. 11.

At time t=0 1100, Tp is set to PBS, Tc is set to CBS, and LUT is set to zero as shown at block 1 102. Upon arrival of a new packet 1104, "new_tokens" is set to the fixed_incr times the difference between the current time and the last time the Tc and/or Tp was updated. Tp' is set to the minimum of the PBS, or the sum of Tp and the new_tokens. Similarly, Tc' is set to the minimum of the CBS, or the sum of Tc and the new_tokens. Finally, LUT is set to the current time ta. Each of these operations is shown at block 1106.

The policing system and methodology of the present invention may be used with multiple protocols, such as IP and FAST packets. In the example of FIG. 11, it is determined whether the packet under consideration is a FAST packet, as depicted at decision block 1108. Various manners of determining whether the packet is a FAST packet may be used, including examining fields in embedded headers that would identify the packet as a FAST packet. If the packet is a FAST packet, then a variable "B" is set to the number of cells (e.g., ATM cells) in the FAST packet payload times forty-eight, as shown at block 1110. This is because FAST packets carry ATM cells, which have a payload of forth-eight octets, and the no_of_cells(packet) is the number of ATM cells that would be needed to segment the packet's payload into ATM cells. While there are fifty-three bytes in an ATM cell, five are reserved for the header, and forty-eight bytes carry the payload. For frame encapsulation, the redundant cell header information may be removed and replicated for each cell. The resulting variable "B" reflects a number of bytes, where the FAST packet size is determined to be the number of bytes "B" required to bear the FAST packet payload if it were segmented into cells.

It should be recognized that a variable, such as variable B, may be analogously scaled for any protocol having such embedded payloads. For example, another type of packet may embed cells of another protocol having a payload of one hundred octets, in which case the block 1110 would be changed accordingly such that the multiplicand is changed from forty-eight to one hundred.

If the packet is not a FAST packet, B is set to the number of bytes in the packet 1 1 12, and the committed "fare" and peak "fare" variables are determined at block 1114. More particularly, c_fare is set to Fc*B, and p_fare is set to Fp*B. Thus, the "fare" required from the committed bucket is the fee factor Fc multiplied with the number of bytes in the packet. Similarly, the "fare" required from the peak bucket is the fee factor Fp multiplied with the number of bytes in the packet.

If Tp' is less than the calculated p-fare as determined at decision block 1116, or if the policing is operating in a color-aware mode and the packet color is already red, the packet will be marked or remain red as shown at block 1118. Otherwise, Tp is set to Tp' minus p_fare as depicted at block 1120, i.e., the Tp is reduced by the current Tp' value minus the current fare imposed on the peak bucket.

If Tc' is less than the calculated c_fare as determined at decision block 1122, or if the policing is operating in a color-aware mode and the packet color is already yellow, the packet will be marked or remain yellow as shown at block 1124.

Otherwise, Tc is set to Tc' minus c_fare as block 1126 illustrates, such that the Tc is reduced to the current Tc' value minus the current fare imposed on the committed, bucket. Such packets are then marked green as in block 1128.

Figure 12:
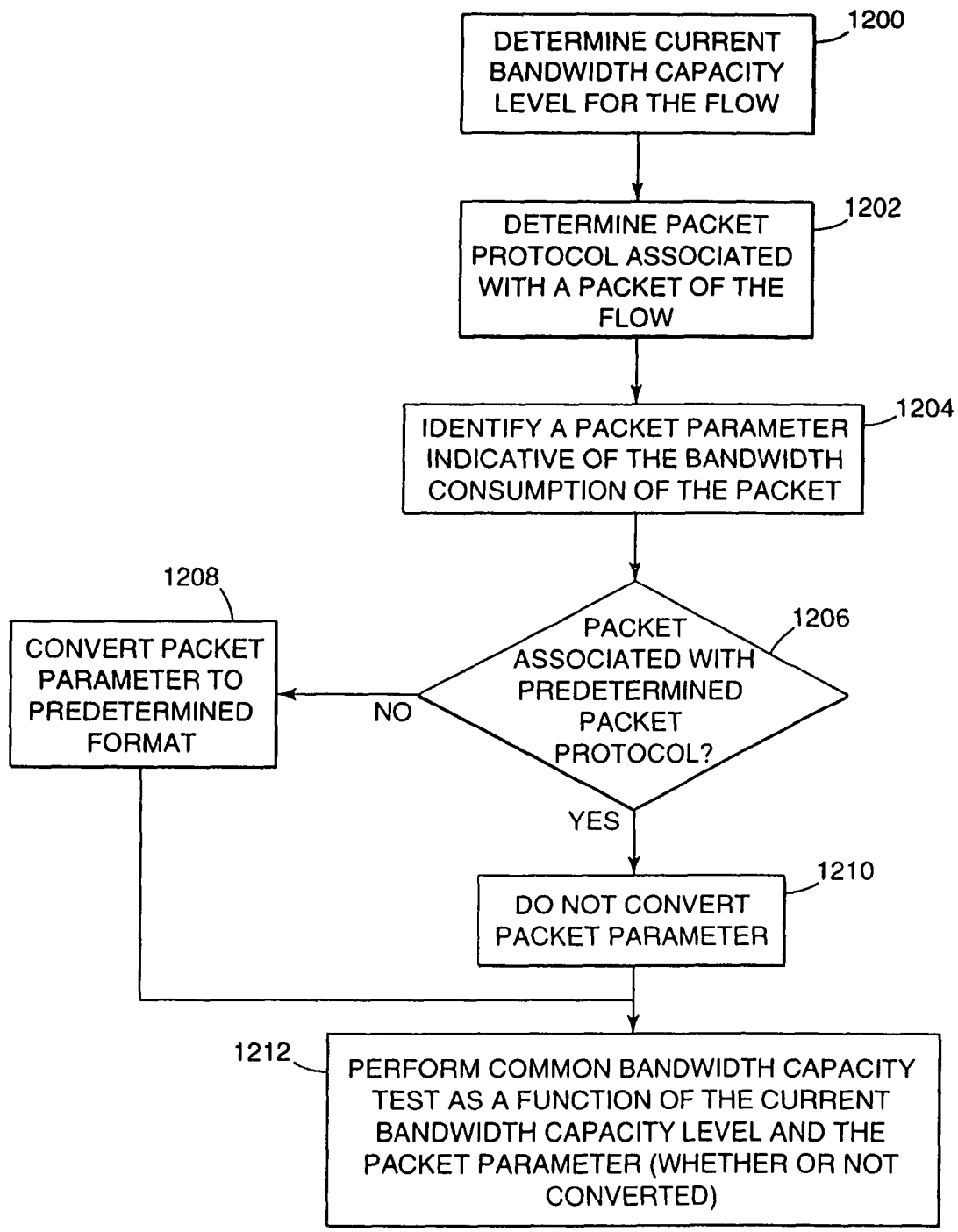
FIG. 12 is a flow diagram illustrating a more general embodiment of a methodology according to the invention where a common policing operation can service multiple traffic protocols.

The example of FIG. 11 is a specific example of a policing methodology in accordance with the invention. FIG. 12 is a flow diagram illustrating a more general embodiment of the invention, which can be applied to each of the flows of a data stream. The current bandwidth capacity level for the flow is determined 1200. For example, the current numbers of committed rate and peak rate tokens in a credit-based system would represent two current bandwidth capacity levels for the flow. The packet protocol associated with the packet under consideration is determined, as illustrated at block 1202. For example, it may be determined whether the packet is a FAST packet, or an IP packet.

A packet parameter indicative of the bandwidth consumption of the packet is identified at block 1204. The "bandwidth consumption" as used in this example refers to a parameter affecting the "fare" for admission of the packet. For example, the size of the packet affects the bandwidth consumed by the packet. Thus, identifying the packet size, such as the number of ATM cells within the packet, is an example of identifying a packet parameter indicative of the bandwidth consumption.

At decision block 1206, it is determined whether the packet is associated with a predetermined packet protocol. The predetermined packet protocol may correspond to one of the protocols of the packets of the data stream, or may be an entirely different packet protocol. In one embodiment, the predetermined packet protocol is an Internet Protocol, where the packet parameter of interest needs no conversion as illustrated at block 1210. This packet parameter is the number of bytes in the packet. However, for other packet protocols, such as FAST packets, a conversion 1208 is required to convert the packet parameter to the predetermined format. Such a conversion may be to convert the frame size from a number of ATM cells to a number of bytes.

By performing such a conversion where necessary, this allows a common bandwidth capacity test to be performed for all packets, regardless of the transmission protocol of the packet. This is depicted at block 1212. The bandwidth capacity test is a function of the current bandwidth capacity level, and the packet parameter (whether or not the packet parameter has been converted). In this manner, any number of flows, having multiple protocols, can be policed with a single policing engine and associated methodology.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, fixed (hard) disk drives, diskettes, CD-ROMs, optical disks, magnetic tape, semiconductor memories such as RAM, ROM, PROMs, etc. Transmitting devices include, but are not limited to, the Internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention, and to create a computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of forwarding packets using processing circuitry comprising:
    classifying a packet from a plurality of packet protocols according to a classification, wherein the classification is determined from at least one parameter indicative of the bandwidth consumption of the packet;
    if the packet is not classified as one of a plurality of predetermined protocols, converting the packet parameter into a predetermined format such that a bandwidth capacity test can be utilized;
    performing the bandwidth capacity test based on the packet parameter; storing in a switch fabric of a communication network the packet in one of a plurality of flows corresponding to the classification, wherein
    each flow corresponds to one of a plurality of flow defining criteria associated with the classification;
    assigning a priority to said plurality of flows based on a result of the bandwidth capacity test; and
    forwarding the packet from said flow according to said priority.

2. The method of claim 1, wherein said plurality of packets is dynamically classified according to said plurality of flow-defining criteria.

3. The method of claim 1, wherein said plurality of packets is dynamically classified according to a plurality of pre-defined packet parameters.

4. The method of claim 1 wherein said flow-defining criteria is associated with a packet transmittal rate.

5. The method of claim 1 wherein said at least one packet parameter comprises a sender address.

6. The method of claim 1 wherein said at least one packet parameter comprises a receiver address.

* * * * *